United States Patent [19]
Fisher et al.

[11] Patent Number: 4,783,811
[45] Date of Patent: Nov. 8, 1988

[54] METHOD AND APPARATUS FOR DETERMINING SYLLABLE BOUNDARIES

[75] Inventors: William M. Fisher, Plano; Kathleen M. Marshall, Dallas, both of Tex.

[73] Assignee: Texas Instruments Incorporated, Dallas, Tex.

[21] Appl. No.: 687,097

[22] Filed: Dec. 27, 1984

[51] Int. Cl.$^4$ .............................................. G10L 5/00
[52] U.S. Cl. ................................................... 381/52
[58] Field of Search ................................ 381/51-53, 381/41; 364/513.5

[56] References Cited
U.S. PATENT DOCUMENTS 4,382,085  6/1982  Glickman et al. ............... 364/200
4,435,617  3/1984  Griggs .................................. 381/44
4,454,586  6/1984  Pirz et al. ............................ 381/41
4,635,199  1/1987  Muraki ................................. 381/51

Primary Examiner—Emanuel S. Kemeny
Attorney, Agent, or Firm—Kenneth C. Hill; Thomas W. DeMond; Melvin Sharp

[57] ABSTRACT

In a text to speech system, digital text ASCII is examined for syllable boundaries to help accent generation for speech synthesis, and hyphenation in word processing. Digital allophone code characters in the form of a byte string are compared with prestored rules. Byte string segments which may comprise consonant clusters, and left and right adjacent environments thereof are examined.

26 Claims, 3 Drawing Sheets

METHOD AND APPARATUS FOR DETERMINING SYLLABLE BOUNDARIES

TECHNICAL FIELD OF THE INVENTION

This invention relates to transformation of symbolic data, and more particularly relates to the determination of syllable boundaries of words in speech synthesis.

RELATED APPLICATION

This application is related to patent application Ser. No. 687,101 entitled "Method for Transforming Symbolic Data," by William M. Fisher, filed concurrently herewith and assigned to the present assignee.

BACKGROUND OF THE INVENTION

Various methods and systems for speech synthesis, including text-to-speech applications, have been heretofore developed. For example, reference is made to the co-pending patent application Ser. No. 240,694 filed Mar. 5, 1981 (now U.S. Pat. No. 4,685,135) and U.S. Pat. No. 4,398,059, issued to Lin et al and assigned to the current assignee.

It is important in such speech synthesis systems that the proper accent be placed at the proper syllable boundaries to provide accurate synthesis of human speech. In addition, it is desirable to have proper syllable boundary determination in a word processor system which provides hyphenation of a word at the end of a text line.

A number of writers in theoretical linguistics have provided abstract principles and rules for syllabification, such as "Aspiration, Tenseness and Syllabification in English" by J. E. Hoard, LANGUAGE, Volume 47, Number 1, March, 1971, pages 133–140; "The Syllable in Phonological Theory" by Joan B. Hooper, LANGUAGE, Volume 48, Number 3, September 1972, pages 525–540; "Syllable-Based Generalizations in English Phonology" by Daniel Kahn, Ph.D. Dissertation for the University of Massachusetts, reproduced by I.U. Linguistics Club, December 1976; and "A Demisyllable Inventory for Speech Synthesis" by J. B. Lovins et al, Speech Communication Papers presented at the 97th Meeting of the Acoustical Society of America, ed. Jared J. Wolf and Dennis H. Klatt, New York Acoustical Society of America, 1971, pages 519–522.

However, the prior art has not produced a computer simulation of syllable rules which may be practically implemented in voice synthesis systems such as text-to-speech systems or which may be used in word processing techniques to provide hyphenation.

SUMMARY OF THE INVENTION

In accordance with the present invention, a method of determining syllable boundaries of words includes the step of converting the words to a string of bytes representing phonemes without marked syllable boundaries. A set of rules are stored which define desired syllable boundaries. The rules are then sequentially applied to transform the bytes in accordance with the rules to a string of bytes with correctly marked syllable boundaries. The string of bytes may then be subsequently used in voice synthesis systems or in word processing hyphenation techniques.

In accordance with another aspect of the invention, a method is provided to determine syllable boundaries in a series of bytes without marked syllable boundaries. A set of rules is stored which defines syllable boundaries. Each of the rules includes a left environment, an input, a right environment and an output. The rules are sequentially compared with the bytes. When the bytes and the associated left and right environments of the bytes match the rules, the bytes are transformed to the output of the rules to provide the proper syllabification.

In accordance with yet another aspect of the invention, a method is provided to determine syllable boundaries in a series of bytes without marked syllable boundaries. A set of rules is stored which defines syllable boundaries, each of the rules including a left environment, an input, a right environment and an output. A pointer is utilized to point to a segment of bytes. The rules are compared to the segment of bytes until a match is found between the left environment, input and right environment of a rule with the segment of bytes. The matched segment of bytes is then transformed by substituting the output of the matched rule for the matched segment of bytes. The transformed bytes may then be utilized to provide proper syllabification in word synthesis or in a word processing environment.

In accordance with still another aspect of the invention, the present syllabification method automatically provides for the syllable boundary immediately preceding a stressed vowel to be placed as far to the left as possible without violating the structure of a good word-initial consonant cluster. Also, the syllable boundary following the stressed vowel is placed as far to the right as possible without violating the structure of a good syllable-final consonant cluster. Allophone varieties to the right of a syllable boundary preceding a stressed vowel are therefore stressed, syllable-initial varieties, while those following the stressed vowel and preceding a syllable boundary are unstressed, syllable- or word-final varieties. Word-internal consonant clusters are, therefore, key elements in determining where syllable-boundaries fall

BRIEF DESCRIPTION OF THE DRAWINGS

For a more complete understanding of the present invention, reference is now made to the following drawings, in which:

FIG. 4 is a representation of typical linked tables for storage of the user-defined symbols of the invention.

DETAILED DESCRIPTION OF THE INVENTION

Figure 1:
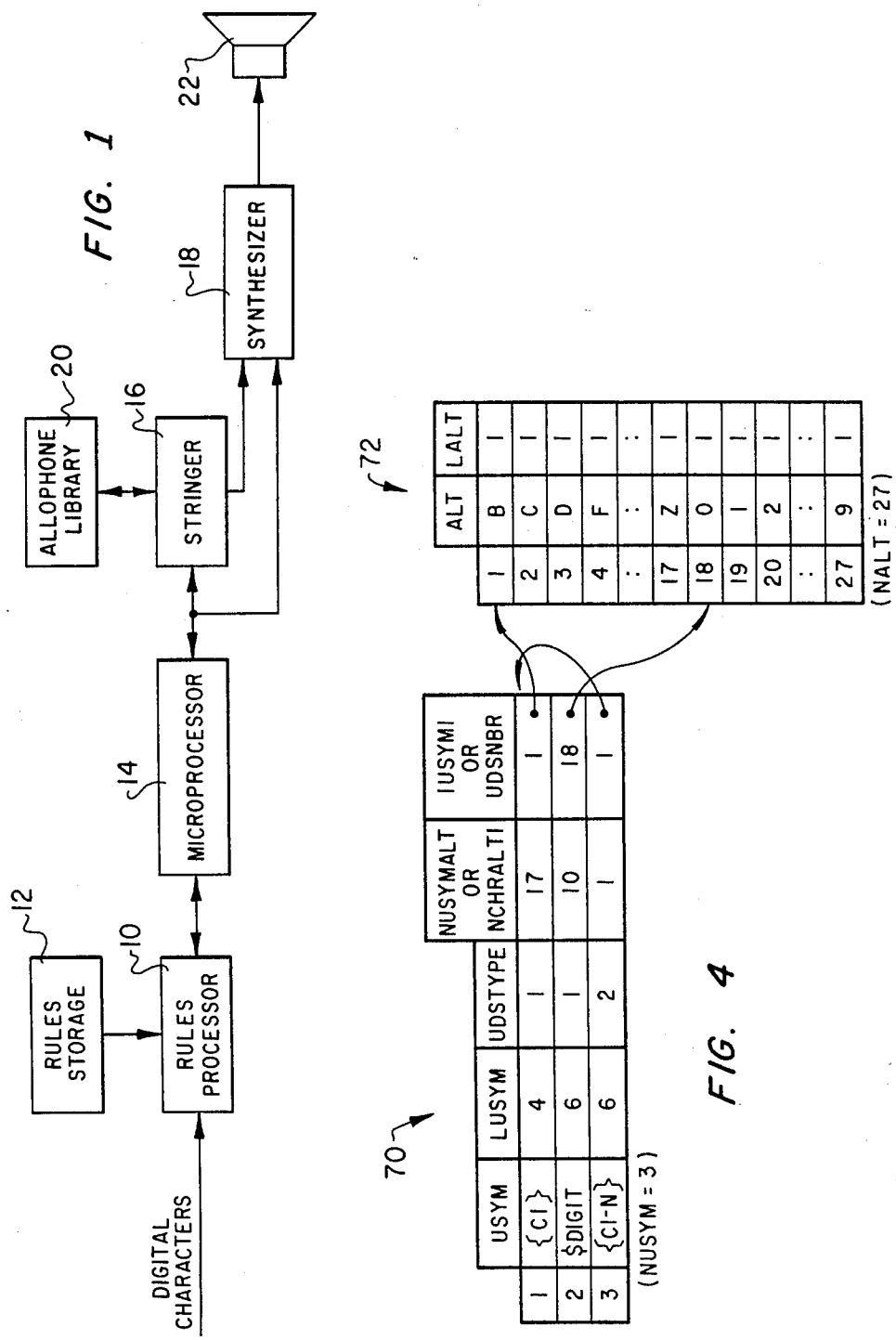
FIG. 1 is a block diagram of a typical text-to-speech system utilizing the syllabification rules of the present invention.

Referring to FIG. 1, a typical text-to-speech system is illustrated in which the present syllabification technique may be utilized. Although the invention will be described with respect to a text-to-speech system, it will be understood that the invention may be used in any other system requiring the proper placement of syllable boundaries. For example, the present technique may be utilized in word processing techniques, such as hyphenation.

Digital allophonic code characters in the form of a byte string are applied to a rules processor 10 for comparison with a stored set of rules in a rules storage 12. After syllabification of the digital characters by the stored rules in the rules processor 10, the transformed string of bytes is entered in the microprocessor 14 which is connected to control a stringer controller 16 and a voice audio synthesizer 18. An allophone library 20 is interconnected with the stringer to apply allophone rules to the stringer. The resulting audio output from the synthesizer 18 is output from a speaker 22 to provide speech-like sounds in response to the input allophonic code.

The rules processor 10 may comprise, for example, a Texas Instruments Inc. type TMCO 420 microcomputer. The rules storage 12 may comprise, for example, a Texas Instruments Inc. type TMS 6100 (TMC 3500) voice synthesis memory which is a ROM internally organized as 16k×8 bits. The microprocessor 14 may also comprise, for example, a type TMCO 420 microcomputer. The stringer 16 may comprise a Texas Instruments Inc. TMCO 356 controller. The allophone library may comprise, for example, a Texas Instruments Inc. type TMS 6100 ROM, or may, alternatively, comprise an internal ROM within the stringer 16. The synthesizer may be of the type described in U.S. Pat. No. 4,209,836 owned by the present assignee.

Additional detail of the construction and operation of the text-to-speech system of FIG. 1 may be found in U.S. Pat. No. 4,398,059 by Lin, et al and assigned to the present assignee and in pending U S. patent application Ser. No. 240,694, filed Mar. 5, 1981 (now U.S. Pat. No. 4,685,135) and assigned to the present assignee. Alternatively, the present syllabification technique may be embodied in other digital processing systems such as a VAX computer or other suitable processors.

The present invention is primarily directed to the operation of the rules processor 10 and the rules storage 12. The present method transforms the input symbolic data represented by the digital characters input to the rule processor 10 into output symbolic data for application to the microprocessor 4. The present invention interprets and applies a data structure representing a set or sets of pattern matching rules, also termed "source" sets of rules. The present invention thus comprises an abstract finite-state transducer driven by table data. The digital characters input to the rule processor 10 will hereinafter be termed "input data" or "input symbolic data" and comprise a string of byte values. The output of the rules processor 10 will hereinafter be termed "output data" or "output symbolic data" which comprises a linear array of byte values which have been ordered by syllable boundaries in accordance with the rules storage 12.

The rules stored in the rules storage 12 comprise a series of one to N sets of rules which are applied iteratively to the input symbolic data. The input symbolic data is stored in a first buffer memory location in processor 10. The selected byte segments of the stored input symbolic data are compared to each of the rules in turn from the appropriate rules section (i.e. p - phoneme syllable rules), until one is found that matches. If one of the rules matches the input data, then the byte segments are transformed and placed in the second memory buffer. Next, the next selected byte segments are compared to each of the rules in turn (from the appropriate section for those bytes), and if a match is found, then the bytes are transformed by the rules. The 1 to N set of rules which can be applied iteratively refer to the process by which the output of one set of rules becomes the input symbolic data to the next set of rules. The number of rule sets to be applied in cascade is thus limited only by the amount of memory used in the system.

Each rule is composed of the traditional four parts; the left environment, the input or source, the right environment and the output or target. The rule output contains the proper syllabification. Each of the four parts of the rule are stored as byte values in the rules storage ROM 12.

Figure 2:
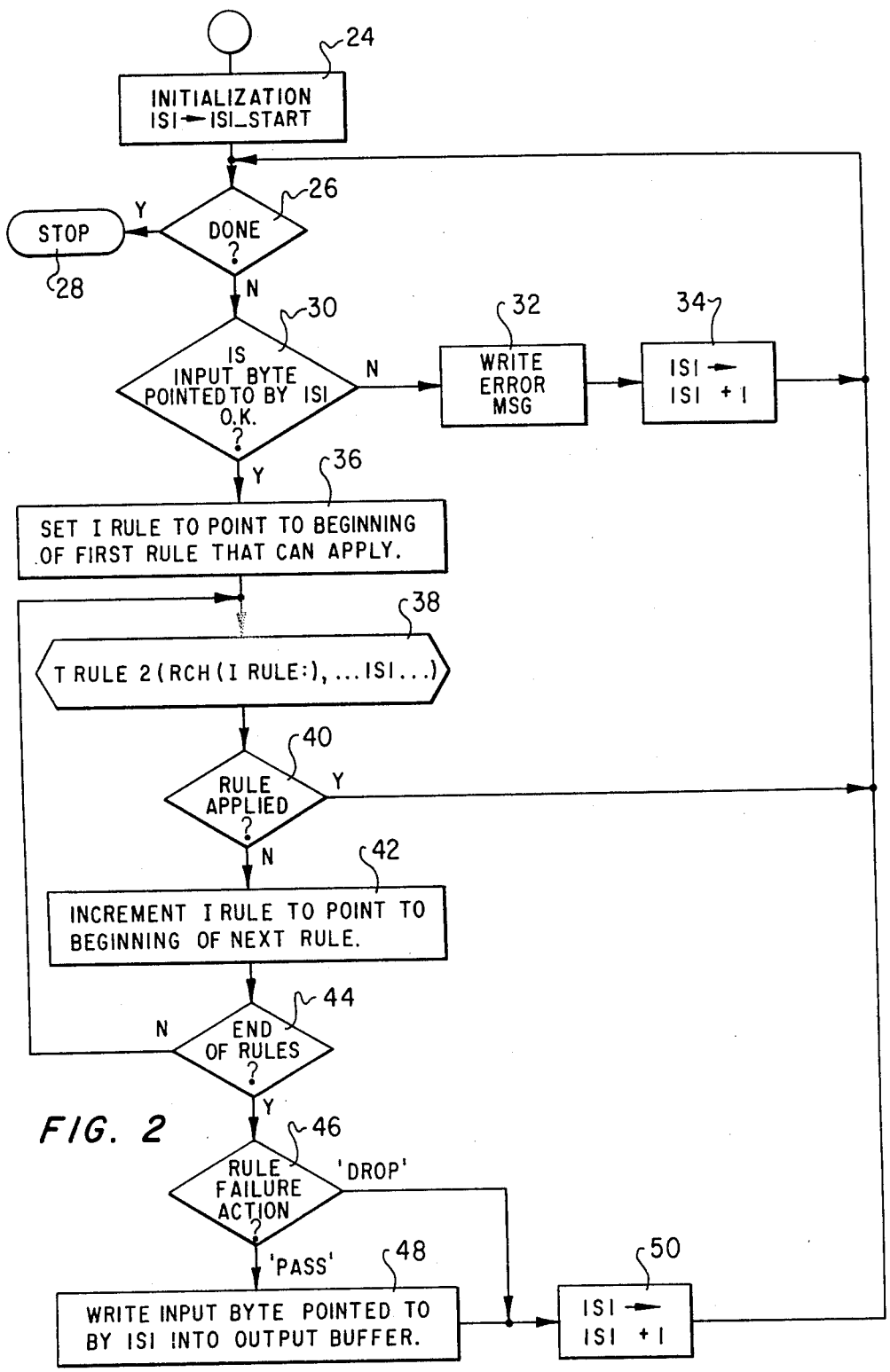
FIG. 2 is a complete computer flow diagram demonstrating the application of the syllabification rules of the present invention.

Referring to FIG. 2, when it is desired to apply a rule, a memory register acting as a pointer or cursor is first initialized at step 24 with the address of the first byte value in the input buffer to be transformed. The local pointer is termed ISI and is set to the initialization value termed ISI START.

A check is made at step 26 as to whether or not all input bytes have been translated. If the answer is yes, the process stops at step 28. If the answer is no, a simple error check is made at step 30 on the input byte which is about to be translated. The check at 30 is a determination as to whether or not the ISI input byte is greater than the lowest possible input code and less than the highest possible input code. If the byte is not satisfactory, an error message is written at step 32 and the pointer to the input string is incremented by one character or one byte at step 34 and the process then loops back to the beginning of the process.

If the check at 30 is satisfactory, an index table is used at step 36 to point to the different rules inside the string of stored rules in ROM 12. At this step, another pointer, which is termed the "I RULE", is set to point to the beginning of the first rule that can apply to the particular byte being reviewed. For example, if the input byte ISI represents the letter "A", then the "I RULE" is set to point to the beginning of the "A" rules. This technique thus allows indexing of rules to be utilized, as will be described with respect to FIG. 5, in order to shorten the search time of rules in accordance with the present invention.

After the index is set to point to the first rule that might apply, a subroutine TRULE 2 is called at step 38 which determines whether or not the rule matches the input byte in accordance with the present invention. TRULE 2 checks the rule designated by the pointer to determine if it matches the input byte string at the particular place being looked at in the program. If the rule does not match, the next rule is found and compared (if there is one). If the rule matches the particular bytes, the subroutine moves the output part of the rule into the output memory buffer and increments the marker of the current end of the output memory buffer. If the rule is determined to apply, then the pointer is incremented to the input memory buffer to just beyond the bytes that have been transformed. The input bytes are thus only transformed once by a particular rule set. This subroutine TRULE 2 also returns a parameter to indicate whether or not the rule comparison was successful. Details of the TRULE 2 subroutine will be subsequently described in greater detail in FIG. 3.

The parameter indicating whether the matching of the rule was successful or not is checked at step 40. If the answer is yes, the program loops back to the major return point of the outside loop to step 26. If the rule was not applied, the pointer is incremented at step 42 from the prior rule to the point of the beginning of the next rule. At step 44, a check is made to determine whether or not all rules in the set that applies to the input byte have been tested. If the answer is no, the program loops back to the step 38 for iteration. The program thus conducts a linear search of the list of rules beginning at the initial point in the list of rules.

The system provides two possible ways to end the linear search of the rules. If the determination at step 44 is that the end of the rules for that input byte has been reached, a decision is made at 46 as to which of two possible rule failure actions will be utilized. The user of the system has the option of choosing either a "PASS" or "DROP" operation.

If the "PASS" operation is chosen, the input byte being pointed to by ISI is written into the output buffer without change at step 48. Thus, the byte being reviewed is not transformed but is passed unchanged into the storage string.

If the determination is made to "DROP" the unapplied byte, the "DROP" path is followed and the input byte being pointed to by ISI is not written into the output buffer, but is dropped. At step 50, the pointer is incremented by one with regard to the bytes in the input memory buffer. The main loop in the subroutine is then followed to iterate the routine.

Figure 3:
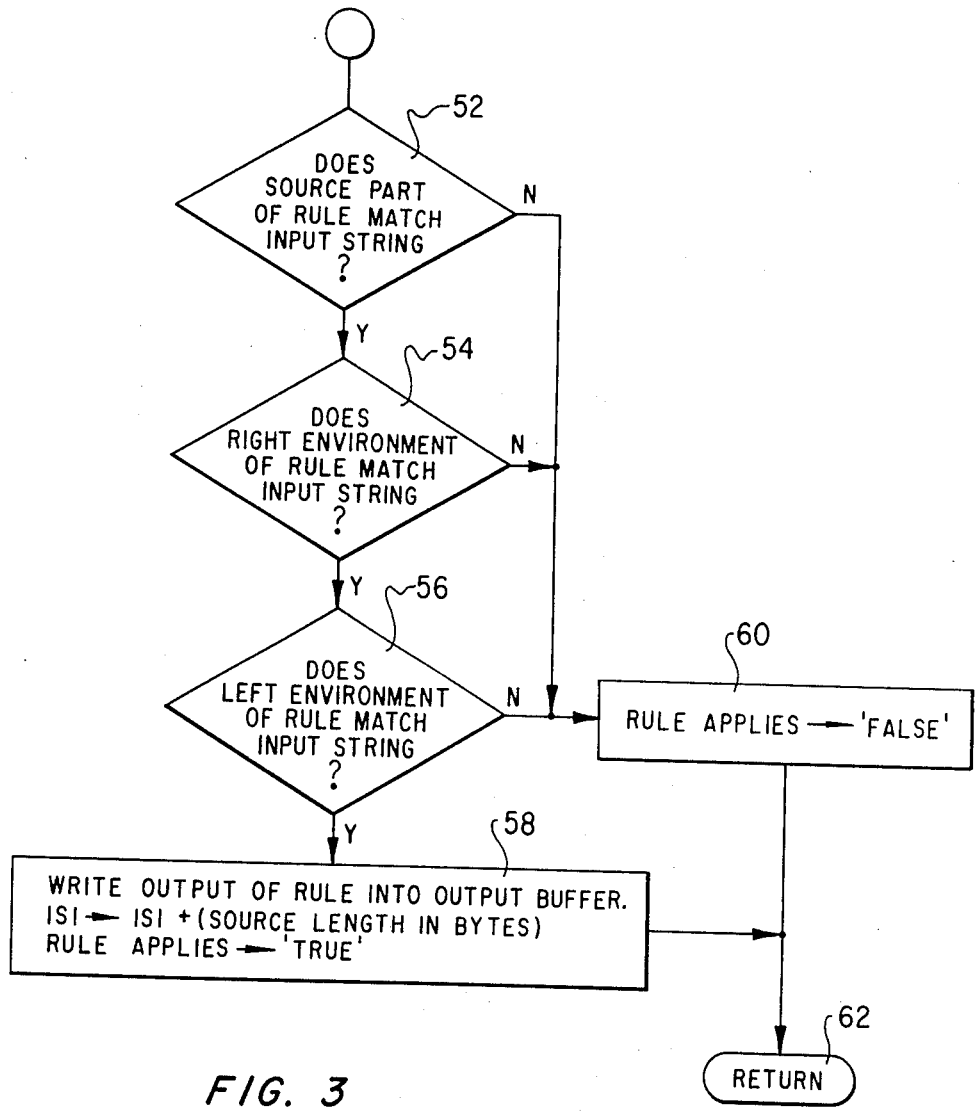
FIG. 3 is a computer flow diagram indicating the matching of the stored syllabifications against input symbolic data.

FIG. 3 illustrates the TRULE 2 subroutine which performs the matching of an input byte of symbolic data to the rule being compared to the input byte string and environment. As noted, each of the stored rules in the memory includes four parts, namely, the left environment, the input, the right environment and the output. As will be subsequently described, the left and right environments are strings of symbols which may be either literal symbols in the input alphabet or symbols that stand for special user-defined symbols. At step 52, the source code of the rule is checked to determine if it matches the input byte string at the location being considered. If the answer is yes, the right environment is checked at step 54. A determination is made at 54 as to whether or not the right environment of the stored rule matches the right environment of the input byte string. If the answer is yes, a determination is made at step 56 as to whether the left environment of the stored rule matches the left environment of the input byte string.

At each of the steps 52, 54, and 56, the stored rule is decoded or unpacked from the data structure. If the stored rule does not match the input string at any of steps 52, 54 or 56, the rule does not apply and a Boolean flag is set in the algorithm and is returned to a calling program to indicate that the rule does not apply.

If the input, left environment and right environment of the rule matches the input byte string, the output of the rule is written at step 58 into the output memory buffer which contains the previously transformed string. The pointer to the selected input byte is then incremented in the input string by the length of source portion of the rule. The indication that the rule applies is output to the return portion 62 for return to the program previously described in FIG. 2. Similarly, if the rule does not apply, a false flag is set at 60 and the subroutine goes to the return portion 62.

As previously indicated, the method set forth in FIGS. 2 and 3 may be implemented in FORTRAN or other suitable languages and run on any one of a number of digital processors. FORTRAN program listings for implementation of the procedures of FIGS. 2 and 3 are set forth on the attached Appendix A. In Appendix A, COMUDS is the coding that defines the data structure used to store the user defined signals. The COMUDS is a listing of the common data area that is the data structure that stores the rules and the indexes to the rules.

The S TRANS 2 subroutine corresponds to the flow chart shown on FIG. 2. The TRULE 2 corresponds to the flow chart shown on FIG. 3. The subroutine termed RUN PACK C unpacks the rule from the data structure into an easier to use representation.

The subroutine C MATCH 2 is used to test whether the rule applies to the input byte string by matching the right environment against the input byte string's right environment. The subroutine CL MATCH 2 is used to match the left environment of the rule against the left environment of the input byte string. The subroutine B MATCH 2 attempts to match single individual symbolic elements. The subroutine BL MATCH 2 is utilized by the CL MATCH 2 subroutine. The subroutine A MATCH 2 is utilized by B MATCH 2. The subroutine AL MATCH 2 is utilized by BL MATCH 2.

An important aspect of the invention is the provision of user-defined symbols in the rules. In the invention, the byte values in the input and output portions of a rule are interpreted literally. That is, in order for the rule to match, the byte values of the rule input must be the same as the corresponding byte values in the input memory buffer. If the rule matches, the literal byte values in the output part of the rule are stored into the output memory buffer as a transformed byte. The contents of the left and right environment, however, are interpreted more generally. If the value of a byte in one of the environmental parts of the rule is below a certain arbitrary value held in an auxiliary register, then that byte must be matched exactly and literally just as the bytes must be in the input and output rule parts. If the byte, however, does not meet this criteria, then it may be a "special symbol" which is interpreted as a pointer to a part of a separate data structure whose contents define a set of byte values, any one of which may match corresponding bytes of the input memory buffer.

Two types of "special symbol" bytes may be defined in the data structure by the user. The first type of symbol (Type 1) is a pointer to a simple list of possible alternate byte values, the matching of any one of which counts as a match of the special symbol byte. Each of the entries in such a list consists of a string of one or more consecutive byte values, all of which must be matched exactly for the entry to match. The second type of symbol (Type 2) is a "N-OR-MORE" symbol having a defining data structure wherein is found a value of a parameter N and a pointer to a special symbol of the first type. The Type 2 symbol will match N or more consecutive occurrences of the indicated Type 1 special symbol. In order to simplify the process using this data structure, the Type 1 special symbol in terms of which the Type 2 special symbol is defined, may be limited to a list of alternatives, each of which is a single byte value. N may have a value of 0 or more.

The user-defined symbol aspect of the present invention has several advantages. The user has another degree of freedom to be used in making up optimum rules by defining patterns perhaps not foreseen by the original programmer. By making up the user's own, more meaningful, names for the symbols, the user can make his rules more understandable and, at the same time, avoid the problems arising when the symbol itself occurs in the text. Further, the program coding is more general and, therefore, more compact.

The definitions of the user-defined symbols are contained in a section of the file of rules, normally before the actual stored source set of rules. Each user-defined symbol is defined by an equation. The left half of the equation is the representation of the user-defined symbol that will be used in the rules to follow and the right half specifies what character strings the user-defined symbol is supposed to match.

As described in greater detail in the previously described co-pending patent application Ser. No. 687,101, Type 1 symbols are defined as lists of alternate literals, which are enclosed in single quotes and separated by slashes. For example, the symbol for high front vowels as a class is defined by the formula:

{VHF}='IY'/'IH'

Type 2 user-defined symbols are those whose definition implies a potentially infinite set of alternatives, such as N-OR-MORE. The interpretation of N-OR-MORE is straightforward: N-OR-MORE X stands for N-OR-MORE concatenate appearances of the pattern X. The pattern X may be restricted, if desired, to a user-defined symbol of Type 1 whose alternates are single characters. That is, X specifies a subset of letters or other input characters. An example of a definition of "1 or more consonants" is:

{C1−N}=1-OR-MORE ({C}), where "{C}" has previously been defined to be a consonant letter or a Type 1 user-defined symbol.

An example of a definition of a symbol standing for "one or more high front vowels" is:

{VHF1−N}=1-OR-MORE({VHF})

The stored rules normally include a header which defines the particular input such as ASCII code and the output code set which may comprise, for example, integer codes for phonemes. Also, the header may define what the user desires to happen if the rules do not apply, such as the drop or pass option previously described. The user-defined special symbols are then stored, followed by the body of the rule set in a text file (see Appendix A).

Another aspect of the invention is that two or more sets of rules may be stacked and sequentially applied. The first set of rules may be applied during a first pass, followed by a second set of rules which are applied to the output of the first pass in a second pass and so on. For example, a second pass of rules may be used to correct a multiple syllable boundary formed by the application of different rules.

It will thus be seen that the special user symbol enables very easy input and utilization of a wide variety of ver generalized rules.

FIG. 4 illustrates the two linked tables used to store data specifying user-defined symbols. The first table 70 contains one row of information for each user-defined symbol and the second table 72 holds the alternate literals used in user-defined symbol Type 1 definitions. FIG. 4 illustrates a typical user-defined symbol data structure holding the definitions of three user-defined symbols as follows:

{C1}='B'/'C'/'D'/'F'/ ...

$DIGIT='0'/'1'/'2'/ ...

{C1−N}=1-OR-MORE({C1})

The table 72 contains all of the alternate literals used in the definition of Type 1 symbols. NALT is the number of entries (in this case 27) in the alternate table. ALT(J) is a character string containing the alternate literal. LALT(J) is the number of characters in alternate J.

Table 70 has one entry of each user-defined symbol. The characters to be used to represent the user-defined number 1 are stored as a character string in USYM(I), of length LUSYM(I). UDSTYPE(I) records the type, either one or two, of the user-defined symbol. When the user-defined number 1 is of Type 1, as in the present example, then NUSYMALT(I) is the number of alternate literals defining the symbol. IUSYMI(I) is a pointer to the first alternate; that is, the first alternate for the user-defined 1 is ALT(IUSYMI)(I). If the user-defined symbol is of Type 2, then NCHRALT1(I) contains a number of repeated patterns in the first or smallest alternate for the user-defined symbol. This is the integer N in the "N-OR-MORE" function noted above. For such Type 2 symbols, UDSNBR(I) is a pointer to the user-defined symbol of Type 1 which specifies the repeated pattern and which was used as the argument "X" in the definition using "N-OR-MORE (X)".

Since NUSYMALT(I) and NCHRALT1(I) are of the same data type and are in complementary distribution, the same area in core memory may be used to store them and the same may apply for IUSYM1(I) and UDSNBR(I).

Referring to the example set forth in FIG. 4, the data structure represents three user-defined symbols. The first, one consonant, is represented by the four characters "{C1}", is of Type 1, has 17 alternatives, and its first alternate is entry #1 in the alternate table (a 'B'). The second user-defined symbol, a digit, is represented by the six characters "$DIGIT", is of Type 1, has 10 alternates, and its first alternate is entry number 18 in the alternate table (a 'B'). The third symbol, one or more consonants, is spelled by the six characters "{C1−N}", and is of Type 2 or a "one-or-more" type. The smallest number of concatenated patterns it will match is one, and the concatenated patterns themselves are defined as user-defined symbol number 1.

The present syllabification method automatically provides for the syllable boundary immediately preceding a stressed vowel to be placed as far to the left as possible without violating the structure of a good word-initial consonant cluster. Also, the syllable boundary following the stressed vowel is placed as far to the right as possible without violating the structure of a good syllable-final consonant cluster. Allophone varieties to the right of a syllable boundary preceding a stressed vowel are therefore stressed, syllable-initial varieties, while those following the stressed vowel and preceding a syllable boundary are unstressed, syllable- or word-final varieties. Word-internal consonant clusters are therefore key elements in determining where syllable-boundaries fall.

The special user-defined symbols or variables for stating the present rules are shown in Table I:

TABLE I

| | | |
|---|---|---|
| {MSTR} | = | '''0'''/'''1'''/'''2'''/'''3'''/ |
| $'0 | = | '''0'''/ |
| {+STR} | = | '''1'''/'''2'''/'''3'''/ |
| {−STR} | = | 0-OR-MORE($'0) |
| () | = | 0-OR-MORE({MSTR}) |
| {C}= | | 'P'/' B'/'T'/'D'/'K'/'G'/'F'/'V'/'TH' /'DH'/'S'/'Z'/'SH' |
| + | | /'ZH'/'HH'/'M'/'N'/'NX'/'L'/'W'/'Y'/'R' /'CH'/'JH'/'WH' |

TABLE I-continued

| | |
|---|---|
| {V}= | 'IY'/ 'IH'/'EY'/'EH'/'AE'/'AA'/'AO'/'OW'/'UH'/'UW'/ |
| + | 'ER'/'AX'/'AY'/'AW'/'OY' |
| {C0-N} = | 0-OR-MORE({C}) |
| {V1-N} = | 1-OR-MORE({V}) |

Comment lines begin with "C" and continuation lines begin with "+". The ARPABET symbols are used in Table I for the segmental phonemes, as defined by "Speech Understanding Systems," by Williams A. Woods et al, BBN Report No. 3438, Bolt Beranck and Newman dnc., Cambridge, December 1976, Vol. 2, P. 72. A period (".") is used to mark the boundary between syllables, a plus ("+"), for a morpheme boundary, and the ARPABET "silence" symbol ("−") for a word boundary. Marks used for stress are shown in the definition of the general symbol (MSTR) for "marked stress". In the phonemic transcriptions, they are located immediately before the vowel. Unstressed vowels need not be so marked, which accounts for the definition of "unstressed" ("{-STR}") as being an optional mark of zero stress. Optionality is expressed by using the "0-OR-MORE" function, which requires a variable of the first type—a list of alternates—as an argument. The mark of zero stress ("$'0") is defined as a Type 1 variable in order to use optionality in the definition of {-STR}. The definition of the symbol for "optional stress mark", "(')", similarly uses "0-OR-MORE" with an argument of "{MSTR}" ("marked stress").

Table II is an example of how the generalizations are expressed by the present set of rules, which shows the syllabification rules for intervocalic consonant clusters beginning with /P/.

(not counting the left and right environments). Thus, the syllable-final marking rules must be ordered, putting the rules with longer sources first, in order for them to put the syllable boundary as far to the right as possible. This also means that all of the final consonant cluster must be in the source part of the rule and none in the right environment; when the rule is applied the cursor moves up to but not past the stretch matching the right environment and that stretch would then be available for the syllable-initial consonant cluster rules to find.

The other 5 rules express generalizations 1 and 4 in marking off syllable-initial clusters. These rules can be in any order and give the same results.

Note that none of the rules shown allows for a morpheme or word boundary. Two other rules, not shown, simply put a syllable boundary in place of a morpheme boundary or word boundary. The consonant cluster rules are written so as not to apply when such a boundary is present; otherwise, a consonant may be stranded in a syllable by itself, the boundary before it being forced by a morpheme boundary and the boundary following it being produced by the usual rules. As an example, consider the word "agreement". The morpheme boundary before "ment" should be marked in the input, because the set of rules will give the syllabification /AX . G R '1 IY M . AX N T/ without the morpheme boundary marking, and will give the more correct /AX . G R '1 IY . M AX N T/ with it. The rule marking off the last syllable in the example without a morpheme boundary is a regular "maximal final cluster" rule for the final "cluster" /M/:

[M]→[M .]/ [{+STR}{V1—N}]_[{C0—N}{—STR}{V}], which reads: "The phoneme 'M' becomes 'M'-syllable-boundary in the environment of one

TABLE II

```
C  CONSONANT CLUSTER RULES
C
C  MAXIMAL FINAL CLUSTERS WITH NEGATIVE STRESS GRADIENT
   [P S]  →  ]P S.]   /[{+STR} {V1-N}]_[{C0-N} {−STR} {V}]
   [P]    →  [P .]    /[{+STR} {V1-N}]_[{C0-N} {−STR} {V}]
C  MAXIMAL INITIAL CLUSTERS OTHERWISE
   [P L]  →  [.P L]   /[{V} {C0-N}]_[(') {V}]
   [P R]  →  [.P R]   /[{V} {C0-N}]_[(') {V}]
   [P W]  →  [.P W]   /[{V} {C0-N}]_[(') {V}]
   [P Y]  →  [.P Y]   /[{V} {C0-N}]_[(') {V}]
   [P]    →  [.P]     /[{V} {C0-N}]_[(') {V}]
```

Generalization number 2 and 5 are expressed in the first two rules shown, which demarcate syllable-final clusters. The rules picking off syllable-final clusters must precede the rules picking off syllable-initial clusters, since the rules are applied from left to right. Since the source part of the rule must consist of literal segments, a rule is required for each final. When a rule applies, the cursor will move beyond the segments matching the source part of the rule; i.e., each rule, when it applies, will transfer the phonemes it matches (or more) stressed vowel preceding it and 0-or-more consonants and an unstressed vowel following it."

A complete set of rules for syllabification is shown in the attached Appendix B.

Table III shows some of the syllabifications resulting from the rule set of Appendix B. Note that the syllable boundaries introduced provide correct environments for the action of some rules and/or processes known to be sensitive to syllable structure: such as nasal assimilation and flapping vs. aspiration of /T/.

TABLE III

```
input:   - K '1 AA N  G  R  AX  S - ("congress")
output:  - K '1 AA NX G  .  .   R AX S - input:   - K AX N G R '1 EH SH AX N AX L - ("congressional")"
output:  - K AX N . G R '1 EH SH . AX . N AX L - input:   - K '1 AA N  K  ER D - ("Concord")
output:  - K '1 AA NX K  .  ER D - input:   - K AX N  K '1 OW R D AX N S - ("concordance")
output:  - K AX N  .  K '1 OW R D . AX N S -
```

TABLE III-continued

| | | | | | | | |
|---|---|---|---|---|---|---|---|
| input: | - | V '1 | IY | T '3 | OW - | ("veto") | |
| output: | - | V '1 | IY | . | T '3 | OW - | |
| | | | | | | | |
| input: | - | W '1 | AA | T | 'O | ER - | ("water") |
| output: | - | W '1 | AA | T . | 'O | ER - | |

To provide synthetic speech with the system of FIG. 1, after syllabification, phoneme symbols are replaced with symbols that represent particular synthetic-speech allophones which are appropriate to the environment determined by the stress and syllabification.

The use of these principles in constructing allophone strings helps the intelligibility of the synthetic speech considerably. The wrong allophonic variant of a single phoneme in a synthetic word whose other allophones have been correctly chosen can reduce the understandability of the whole word. The word "shopping" synthesized with an aspirated /P/ allophone was recognized only 30% of the time in a test of allophone word intelligibility. In another test, the same word made with a very weakly aspirated version of the /P/ was recognized more than 80% of the time.

The sounds which precede the stressed vowel in a word or phrase are the phonetically strong versions of the sound or sound cluster, just as a stressed vowel is a phonetically strong vowel. For instance, in the word "veto", a speaker may be uncomfortable about using a flap /T/, whereas in "potato" or "butter" the flap is perfectly natural. If the word "internal" is synthesized with a weak /T/, it sounds very unnaural, while using an initial /T/ allophone makes it sound much more natural.

Vowels which are followed by liquids such as the phonemes /L/ and /R/ are also examples of the way stress (and syllable boundary placement) affect the phonetic realization of the phonemic input. The word "eLECTRric" (where the stress falls on the "lect" syllable) phonetically separates the "e" and the "1", so that the /L/ used is phonetically clear. In the word "elementary", the secondary stress on the first syllable unites the "1" to the "e", which makes it dark or velarized and strongly colors the quality of the /EH/ as well. The words "felony" versus "felonious" and "parameter" versus "parametric" also illustrate this effect.

Although the preferred embodiment has been described in detail, it should be understood that various changes, substitutions and alterations can be made therein without departing from the spirit and scope of the invention as defined by the appended claims.

I. EXAMPLE OF MAIN-LINE CODING USING STRANS2 TO APPLY SYMBOLIC RULES

```
C DATA TO BE TRANSFORMED IS IN BSTR(1:PB)
      BSTR_INPUT=.TRUE.
C APPLY RULES
      DO 1800 IRLS=1,N_RULE_SETS
      IF (BSTR_INPUT) THEN
         CALL STRANS2(BSTR,1,PB,ASTR,PA,IRLS)
      ELSE
         CALL STRANS2(ASTR,1,PA,BSTR,PB,IRLS)
      ENDIF
 1800 BSTR_INPUT=.NOT. BSTR_INPUT
C TRANSFORMED DATA (RULE OUTPUT) IS NOW IN BSTR(1:PB) IF
C BSTR_INPUT IS .TRUE., IN ASTR(1:PA) OTHERWISE.
```

II. DATA STRUCTURE DEFINITIONS INCLUDED IN SUBROUTINE CODING

A. FILE COMRDS.FOR COMMON DATA STRUCTURE FOR RULE DATA SETS

```
      PARAMETER NMAX_RULE_SETS=20
      PARAMETER NMAX_RCH=32000
      PARAMETER IND_MAX=2048
C
C NECESSARY DATA:
C
C STRING OF CODED RULES:
      CHARACTER*32000 RCH
C RULE GROUP STOP CODE CHARACTER:
      CHARACTER RSTOP_CODE
C INTERNAL STORAGE FORMAT TYPE:
C ('A' (DEFAULT) = AS PACKED BY SUBROUTINE 'RPACKA')
C ('C' = AS PACKED BY SUBROUTINE 'RPACKC')
      CHARACTER R_INTERNAL FORMAT
```

```
C INDEX TO STRING OF CODED RULES:
      INTEGER*2 IND(IND_MAX)
C NUMBER OF RULE SETS:
      INTEGER*2 N_RULE_SETS
C TABLES OF OFFSETS
      INTEGER*2 RCH_OFFSET(NMAX_RULE_SETS+1)
      INTEGER*2 IND_OFFSET(NMAX_RULE_SETS+1)
      INTEGER*2 UDS_OFFSET(NMAX_RULE_SETS+1)
C TABLES DEFINING RANGE OF POSSIBLE VALUE FOR UDS CODES
      INTEGER*2 MIN_UDS_CODE(NMAX_RULE_SETS)
      INTEGER*2 MAX_UDS_CODE(NMAX_RULE_SETS)
C WHAT TO DO IF RULES DON'T APPLY TO A SEGMENT:
C (EITHER 'PASS' THE SEGMENT OR 'DROP' IT)
      CHARACTER*4 RFAIL_ACTION(NMAX_RULE_SETS)
C TYPE OF INDEXING FOR EACH RULE SET:
C ('A'=NO INDEXING,'B'=1-STAGE TABLE KEYED ON S(1:1)
      CHARACTER INDEX_TYPE(NMAX_RULE_SETS)
C
      COMMON /COMN_RDS_C/ RCH,RSTOP_CODE,RFAIL_ACTION,
     +,INDEX_TYPE,R_INTERNAL_FORMAT
      COMMON /COMN_RDS_N/ IND
     +,N_RULE_SETS
     +,RCH_OFFSET,IND_OFFSET,UDS_OFFSET
     +,MIN_UDS_CODE,MAX_UDS_CODE
C
C AUXILIARY DATA:
C NAMES OF RULE FILES
      CHARACTER*40 RFILENAME(NMAX_RULE_SETS)
C POINTERS TO INPUT AND OUTPUT CODE SETS
      INTEGER*2 PCODE_IN(NMAX_RULE_SETS)
      INTEGER*2 PCODE_OUT(NMAX_RULE_SETS)
C TOTAL NUMBER OF RULES
      INTEGER*2 NRULES_TOT
C NUMBER OF RULES IN EACH RULE SET
      INTEGER*2 NRULES(NMAX_RULE_SETS)
C
      COMMON /COMA_RDS_C/ RFILENAME
      COMMON /COMA_RDS_N/ PCODE_IN,PCODE_OUT
     +,NRULES_TOT,NRULES
```

B. FILE CMUDS.FOR COMMON AREA FOR USER-DEFINED SYMBOL TABLES

```
      PARAMETER MAX_USYMS=128
      PARAMETER MAX_USYM_ALTS=1024
C
      INTEGER*2 NUSYM! NBR OF USER-DEFINED SYMBOLS
      INTEGER*2 NALT! TOTAL NBR OF U.D.S. ALTERNATES
C               IN TABLE "ALT"
      INTEGER*2 LUSYM(MAX_USYMS)! LENGTH IN CHARACTERS
C               OF EACH USER-DEFINED SYMBOL
      INTEGER*2 IUSYM1(MAX_USYMS)! POINTER TO FIRST
C               ALTERNATIVE FOR EACH U.D.S.
      INTEGER*2 NUSYMALT(MAX_USYMS)! NUMBER OF ALTERNATES
C               FOR EACH UDS
      INTEGER*2 LALT(MAX_USYM_ALTS)! LENGTH IN CHARACTERS
C               OF EACH ALTERNATIVE
C NUMERIC DATA FOR TYPE 2 UDS:
      INTEGER *2 NCHRALT1(MAX_USYMS),UDSNBR(MAX_USYMS)
      EQUIVALENCE (NCHRALT1,NUSYMALT),(UDSNBR,IUSYM1)
      INTEGER*2 UDSTYPE(MAX_USYMS)
C
      CHARACTER*12 USYM(MAX_USYMS)! TABLE OF CHARACTER
C               REPRESENTATIONS FOR EACH U.D.S.
```

```
       CHARACTER*6 ALT(MAX_USYM_ALTS)! TABLE OF CHARACTER
C                  REPRESENTATIONS FOR EACH U.D.S. ALTERNATIVE
C
       COMMON /USYM_NBR_DATA/NUSYM,NALT,LUSYM,IUSYM1,NUSYMALT,
      +LALT, UDSTYPE
       COMMON /USYM_CHR_DATA/USYM,ALT
C
C COMUDS END
C
```

C. FILE COMPCODES.FOR COMMON DATA STRUCTURE FOR PCODE SETS

```
C ALL AUXILIARY DATA
C ** VERSION 2 - PCODENBR LOOKS LIKE A CHARACTER **
C ** VERSION 3 - 2-D ARRAYS REDUCED TO 1-D W/OFFSET PER
C CODESET**
C ** VERSION 4 - CONTAINS VARIABLES FOR MAX_SEG_CODE ETC.
C
       PARAMETER MAXPCODESETS=4
       PARAMETER MAXPCODES=512
       PARAMETER MAXPCHR=6
C MAXIMUM VALUES FOR THE 3 TYPES OF PC CODE:
       PARAMETER MAXTPCVAL=254
       PARAMETER MAXPPCVAL=254
       PARAMETER MAXAPCVAL=254
C
       CHARACTER*72 PCODEDESC(MAXPCODESETS)
       CHARACTER*40 PCODEFILE(MAXPCODESETS)
       LOGICAL SEPARATOR(MAXPCODESETS)
C NOTE: NEXT LINE SHOULD REALLY BE:
C      CHARACTER*MAXPCHR  PCODECHR(MAXPCODES)
       CHARACTER*6         PCODECHR(MAXPCODES)
       CHARACTER PCODENBR(MAXPCODES)
      +,TYPE(MAXPCODESETS)
C NOTE: TYPE VALUES: T=TEXT,P=PHONOLOGICAL,A=PHONETIC
      +,SEP_CODE(MAXPCODESETS)
C NOTE: IF (SEPARATOR(ICODE), SEP_CODE HOLDS THE SEPARATOR
C CODE
      +,MIN_CODE(MAXPCODESETS)
      +,MAX_CODE(MAXPCODESETS)
      +,MIN_SEG_CODE(MAXPCODESETS)
      +,MAX_SEG_CODE(MAXPCODESETS)
      +,MIN_SUPRA_CODE(MAXPCODESETS)
      +,MAX_SUPRA_CODE(MAXPCODESETS)
      +,MIN_PARA_CODE(MAXPCODESETS)
      +,MAX_PARA_CODE(MAXPCODESETS)
       INTEGER*2 LPCODECHR(MAXPCODES)
      +,NPCODES(MAXPCODESETS)
      +,OFFSET_PC(MAXPCODESETS)
      +,NPCODESETS,NTOTOPCS
      +,PARMAX(16),PARMIN(16)
C
       COMMON /PCHRDATA/PCODEFILE,PCODEDESC,PCODECHR,PCODENBR
      +,MIN_CODE,MAX_CODE
      +,MIN_SEG_CODE,MAX_SEG_CODE
      +,MIN_SUPRA_CODE,MAX_SUPRA_CODE
      +,MIN_PARA_CODE,MAX_PARA_CODE
      +,TYPE,SEP_CODE
       COMMON /PNBRDATA/LPCODECHR,NPCODES,OFFSET_PC,NPCODESES,
      +,NTOTPCS,PARMAX,PARMIN,SEPARATOR
C COMPCODES END
```

III. SUBROUTINE CODING

A. SUBROUTINE STRANS2.FOR

```fortran
C
      SUBROUTINE STRANS2(IN_STR,ISI_START,ISI_END,
     +OUT_STR,ISO,
     +RULE_SET_NBR)
      CHARACTER*(*) IN_STR,OUT_STR
      INTEGER*2 ISI_START,ISI_END,ISO,RULE_SET_NBR
C
C *** NB-WHEN CHANGING, ALSO CHANGE STRANS2F AND STRANS2T ***
C
C APPLIES BYTE-STRING TRANSFORMING RULES TO INPUT STRING
C PRODUCING OUTPUT STRING
C INPUT STRING: IN_STR(ISI_START:ISI_END)
C OUTPUT STRING: OUT_STR(1:ISO)
C RULES TO BE APPLIED ARE FOUND IN COMMON AS RULE SET
C NUMBER <RULE_SET_NBR>
C NODIFIED 8/7/81 TO USE RULES PACKED INTO EITHER FORMAT 'A'
C OR 'C'
      INCLUDE '[FISHER.PROD]COMRDS.FOR'
      INCLUDE '[FISHER.PROD]COMPCODES.FOR'
C
C LOCAL VARIABLES:
      INTEGER*2 ISI,INDSTART,IBYTE,IRULE,LS,IX,LPR
      CHARACTERS IN_CHR,MIN_CODE_IN,MAX_CODE_IN
      LOGICAL RULE_APPLIED
C CODE:
D     TYPE *,' ENTERING STRANS2
D     TYPE *,'   ISI_START=',ISI_START
D     TYPE *,'   ISI_END  =',ISI_END
D     DO 69 IDB=ISI_START,ISI_END
D     TYPE *,'    I=',IDB,', ICHAR(IN_STR(I:I))=',
D    ICHAR(IN_STR(IDB:IDB))
D  69 CONTINUE
C OVER-ALL INITIALIZATION
      ISO=0
      ISI=ISI_START
C NOTE: ISI POINTS TO NEXT INPUT BYTE
C ISO POINTS TO LAST BYTE WHICH WAS OUTPUT
      MIN_CODE_IN=MIN_CODE(PCODE_IN(RULE_SET_NBR))
      MAX_CODE_IN=MAX_CODE(PCODE_IN(RULE_SET_NBR))
      INDSTART=IND_OFFSET(RULE_SET_NBR)
C RETURN POINT FOR MAJOR LOOP ON ISI
  100 CONTINUE
      IF (ISI .GT. ISI_END) GO TO 900
      IN_CHR=IN_STR(ISI:ISI)
      IBYTE=ICHAR(IN_CHR)
      IF ((IN_CHR .LT. MIN_CODE_IN).OR.
     (IN_CHR .GT. MAX_CODE_IN)) THEN WRITE(6,120)IBYTE,
      RULE_SET_NBR
  120 FORMAT(' *STRANS FINDS INVALID INPUT CODE',I3
     +/' (APPLYING RULE SET',I2,')')
      ISI=ISI+1
      GO TO 100
      ENDIF
      IX=IBYTE+INDSTART
      IRULE=IND(IX)
      IF (IRULE .LT. 1) GO TO 300
  200 CONTINUE
      IF (R_INTERNAL_FORMAT .EQ. 'C') THEN
      CALL TRULE2C(RCH(IRULE:),IN_STR,ISI,ISI_END
     +,RULE_APPLIED,OUT_STR,ISO,LPR,RULE_SET_NBR)
      ELSE
```

```
          CALL TRULE2A(RCH(IRULE:),IN_STR,ISI,ISI_END
         +,RULE APPLIED,OUT_STR,ISO,RULE_SET_NBR)
          LPR=ICHAR(RCH(IRULE:IRULE))
          ENDIF
          IF (RULE_APLIED) THEN
D     TYPE *,' RULE APPLIED'
D     IF (ISO .GT. 0) THEN
D       IDB1=ICHAR(OUT_STR(ISO:ISO))
D       TYPE *,' ISO=',ISO,' ICHAR(OUT_STR(ISO:ISO))=',IDB1
D     ELSE
D       TYPE *,' ISO NOT > 0 (NO OUTPUT YET)'
D     ENDIF
          GO TO 100
          ENDIF
C RULE DIDN'T APPLY
C BUMP RULE CODE POINTER BY LENGTH OF RULE
D     TYPE *,' RULE DID NOT APPLY'
          IRULE=IRULE+LPR
C IF MORE RULES IN THIS GROUP, GO BACK
      IF (RCH(IRULE:IRULE) .NE. RSTOP_CODE) GO TO 200
C OTHERWISE, NO RULE MATCHES THIS INPUT SEGMENT
      300 CONTINUE
          IF (RFAIL_ACTION(RULE_SET_NBR) .EQ. 'PASS') THEN
            IF (ISO .GE. LEN(OUT_STR)) THEN
              TYPE *,' *STRAN2 HAS OUTBUFF OVF, LOSES'IBYTE
            ELSE
              ISO=ISO+1
              OUT_STR(ISO:ISO)=IN_CHR
            ENDIF
          ENDIF
          ISI=ISI+1
          GO TO 100
C
      900 CONTINUE
          RETURN
          END
```

B. SUBROUTINE TRULE2A.FOR

```
          SUBROUTINE TRULE2A(RULE,IN_STR,ISI,ISI_RGT_LIM,
         +RULE_APPLIES,OUT_STR,ISO,
         +RULE_SET_NBR)
          CHARACTER*(*) IN_STR,OUT_STR,RULE
          INTEGER*2 ISI,ISI_RGT_LIM,ISO,RULE_SET_NBR
          LOGICAL RULE_APPLIES
C
C TRIES TO APPLY RULE TO STRING <IN_STR(1:ISI_RGT_LIM)>
C AT CURSOR POSITION <ISI>.
C RETURNS DECISION AS <RULE_APPLIES>, PLUS OUTPUT
C OF RULE IN OUT_STR(ISO1:ISO2), WHERE:
C ISO1=VALUE OF ISO ON ENTRY + 1
C ISO2=VALUE OF ISO ON EXIT
C IF RULE APPLIES, BUMPS ISI BY LENGTH OF S PART
C WORKS ONLY WITH RULES PACKED INTO INTERNAL FORMAT 'A'
C
C LOCAL VARIABLES:
          LOGICAL RE_MATCHES,LE_MATCHES
          INTEGER*2 ISI_RGT,ISO_RGT_LIM,LS,LT,LLE,LRE
         +,IR,ISAVE,LPR,IERR
         +,ISI_LIM,NEW_ISO,IX,ILRE,IRLE,L(4)
          EQUIVALENCE (LS,L(1)),(LRE,L(2)),(LLE,L(3)),(LT,L(4))
          CHARACTER*32 RPART
C LOGICAL SUBROUTINES:
          LOGICAL CMATCH2,CLMATCH2
```

```
C CODE:
C GET AND CHECK SOURCE PART OF RULE
      CALL RUNPACKA(RULE,LPR,L,RPART,1,ISAVE,IERR)
C (RPART NOW HOLDS "S" PART OF RULE)
D     TYPE*,'   IN TRULE2A'
D     TYPE*,'    ISI=',ISI,' ISI_RGT_LIM=',ISI_RGT_LIM
D     IDB1=ICHAR(RPART(1:1))
D     TYPE *,'    LS=',LS,' ICHAR(S(1:1((=',IDB1
      ISI_RGT=ISI+LS-1
      IF (ISI_RGT .GT. ISI_RGT_LIM) GO TO 8888
      IF (IN_STR(ISI:ISI_RGT) .NE. RPART(1:LS)) GO TO 8888
C SOURCE PART PASSES -- GET AND CHECK RIGHT ENVIRONMENT PART
      CALL RUNPACKA(RULE,LPR,L,RPART,2,ISAVE,IERR)
C (RPART NOW HOLDS "RE" PART OF RULE)
D     TYPE *,'   @IR=',IR,' LRE=',LRE
C IF LENGTH OF RE IS ZERO THEN RE MATCHES
      IF (LRE .LT. 1) GO TO 200
C OTHERWISE CHECK WITH SUBROUTINE
      ILRE=ISI+LS
      ISI_LIM=ISI_RGT_LIM-ILRE+1
D     TYPE *,'    JUST BEFORE CMATCH2, ILRE=',ILRE,'
     +LIM=',ISI_LIM
      RE_MATCHES=CMATCH2(RPART(1:LRE),LRE,IN_STR(ILRE:),ISI_LIM,
     +IX,RULE_SET_NBR)
C (NOTE: IX IS THE LENGTH OF MATCH, NOT USED AT PRESENT)
      IF (.NOT. RE_MATCHES) GO TO 8888
C RE PART PASSES -- GET AND CHECK LEFT ENVIRONMENT PART
  200 CONTINUE
      CALL RUNPACKA(RULE,LPR,L,RPART,3,ISAVE,IERR)
C (RPART NOW HOLDS "LE" PART OF RULE)
C NOTE -- LLE = L(3)
D     TYPE *,'   @IR=',IR,' LLE=',LLE
      IF (LLE .EQ. 0) GO TO 300
      IRLE=ISI-1
      LE_MATCHES=CLMATCH2(RPART(1:LLE),LLE,IN_STR,IRLE,
     -+IX,RULE_SET_NBR)
      IF (.NOT. LE_MATCHES) GO TO 8888
C LE PART PASSES -- RULE APPLIES !!!
  300 CONTINUE
      CALL RUNPACKA(RULE,LPR,L,RPART,4,ISAVE,IERR)
C (RPART NOW HOLDS "T" PART OF RULE)
D     TYPE *,'    RULE MATCH, @IR=',IR,' LT=',LT
      IF (LT .LT. 1) GO TO 400
      NEW ISO-ISO+LT
D   . TYPE *,'    NEW_ISO=',NEW_ISO
      IF (NEW_ISO .GT. LEN(OUT_STR)) THEN
        TYPE *,' *TRULE2A HAS OUTBUFF OVF'
      ELSE
        OUT STR(ISO+1:)=RPART(1:LT)
        ISO=NEW_ISO
      ENDIF
  400 RULE APPLIES = .TRUE.
      ISI=ISI+LS
      GO TO 9999
C FAILURE -- RULE DOES NOT APPLY
  888 CONTINUE
      RULE_APPLIES = .FALSE.
C EXIT
  999 CONTINUE
      RETURN
      END
```

C. SUBROUTINE TRULE2C.FOR

```
      SUBROUTINE TRULE2C(RULE,IN_STR,ISI,ISI_RGT_LIM,
     +RULE_APPLIES,OUT_STR,ISO,LPR,
     +RULE_SET_NBR)
      CHARACTER*(*) IN_STR,OUT_STR,RULE
      INTEGER*2 ISI,ISI_RGT_LIM,ISO,LPR,RULE_SET_NBR
      LOGICAL RULE_APPLIES
C
C TRIES TO APPLY RULE TO STRING <IN_STR(1:ISI_RGT_LIM)>
C AT CURSOR POSITION <ISI>.
C RETURNS DECISION AS <RULE_APPLIES>, PLUS OUTPUT
C OF RULE IN OUT_STR§ISO1:ISO2), WHERE:
C  ISO1=VALUE OF ISO ON ENTRY + 1
C  ISO2=VLAUE OF ISO ON EXIT
C IF RULE APPLIES, BUMPS ISI BY LENGTH OF S PART
C LENGTH OF PACKED RULE RETURNED IN LPR
C
C WORKS ONLY WITH RULES PACKED INTO INTERNAL FORMAT 'C'
C
C LOCAL VARIABLES:
      LOGICAL RE_MATCHES,LE_MATCHES
      INTEGER*2 ISI_RGT,ISO_RGT_LIM,LS,LT,LLE,LRE
     +,IR,ISAVE,LS_CODED
     +,ISI_LIM,NEW_ISO,IX,ILRE,IRLE,L(4)
      EQUIVALENCE (LS_CODED,L(1)),(LRE,L(2)),(LLE,L(3))
     +,(LT,L(4))
      CHARACTER*32 S,RE,LE,T
      EQUIVALENCE (S,RE,LE,T)
C LOGICAL SUBROUTINES:
      LOGICAL CMATCH2,CLMATCH2
C CODE:
C GET AND CHECK SOURCE PART OF RULE
      CALL RUNPACKC(RULE,LPR,L,S,1,ISAVE,IERR)
D     TYPE *,'   IN TRULE2C'
D     TYPE *,'    ISI=',ISI,' ISI_RGT_LIM=',ISI_RGT_LIM
D     IDB1=ICHAR(S(1:1))
D     TYPE *,'    LS=',LS,' ICHAR(S(1:1))=';,IDB1
      LS=LS_CODE+1
      ISI_RGT=ISI+LS-1
      IF (ISI_RGT .GT. ISI_RGT_LIM) GO TO 8888
      IF (IN_STR(ISI+1:ISI_RGT) .NE. S(1:LS_CODED)) GO TO 8888
C SOURCE PART PASSES -- GET AND CHECK RIGHT ENVIRONMENT PART
      CALL RUNPACKC(RULE,LPR,L,RE,2,ISAVE,IERR)
D     TYPE *,' @IR=',IR,' LRE=',LRE
C IF LENGTH OF RE IS ZERO THEN RE MATCHES
      IF (LRE .LT. 1) GO TO 200
C OTHERWISE CHECK WITH SUBROUTINE
      ILRE=ISI+LS
      ISI_LIM=ISI_RGT_LIM-ILRE+1
D     TYPE *,' JUST BEFORE CMATCH2, ILRE=',ILRE,' LIM='
     +,ISI_LIM
      RE_MATCHES=CMATCH2(RE(1:LRE),LRE,IN_STR(ILRE:),ISI_LIM,
     +IX,RULE_SET_NBR)
C (NOTE: IX IS THE LENGTH OF MATCH, NOT USED AT PRESENT)
      IF (.NOT RE_MATCHES) GO TO 8888
C RE PART PASSES -- GET AND CHECK LEFT ENVIRONMENT PART
  200 CONTINUE
      CALL RUNPACKC(RULE,LPR,L,LE,3,ISAVE,IERR)
C NOTE -- LLE = L(3)
D     TYPE *,' @IR=',IR,' LLE=',LLE
      IF (LLE .EQ. 0) GO TO 300
      IRLE=ISI-1
      LE_MATCHES=CLMATCH2(LE(1:LLE),LLE,IN_STR,IRLE,
     +IX,RULE_SET_NBR)
      IF (.NOT. LE_MATCHES) GO TO 8888
```

```
C LE PART PASSES -- RULE APPLIES !!!
  300 CONTINUE
      CALL RUNPACKC(RULE,LPR,L,T,4,ISAVE,IERR)
D     TYPE *,'   RULE MATCH, @IR=',IR,' LT=',LT
      IF (LT .LT. 1) GO TO 400
      NEW_ISO=ISO+LT
D     TYPE *,'   NEW_ISO=',NEW_ISO
      IF (NEW_ISO .GT. LEN(OUT_STR)) THEN
        TYPE *,' *TRULE2C HAS OUTBUFF OVF'
      ELSE
        OUT_STR(ISO+1:)=T(1:LT)
        ISO=NEW_ISO
      ENDIF
  400 RULE_APPLIES = .TRUE.
      ISI=ISI+LS
      GO TO 9999
C FAILURE -- RULE DOES NOT APPLY
 8888 CONTINUE
      RULE_APPLIES = .FALSE.
C EXIT
 9999 CONTINUE
      RETURN
      END

D. FILE CMATCH2.FOR

LOGICAL FUNCTION CMATCH2(PAT,PATLIM,STR,STRLIM,
     +LSTRMATCH,IRLS)
      CHARACTER*(*) PAT,STR
      INTEGER*2 PATLIM,STRLIM,LSTRMATCH,IRLS
C
C CMATCH TRIES TO MATCH THE PATTERN IN PAT TO THE STRING IN
C STR.
C LIMITS ARE PAT(1:PATLIM), STR(1:STRLIM)
C IRLS IS THE RULE SET NUMBER
C LSTRMATCH RETURNS THE NUMBER OF STRING ELEMENTS MATCHED IN
C STR.
C IF SUCCESSFUL, CMATCH=.TRUE. AND THE STRING WAS MATCHED
C OVER STR(1:LSTRMATCH).  IF NOT SUCCESSFUL, CMATCH=.FALSE.
C AND LSTRMATCH=0
C OPERATES IN LEFT ANCHOR MODE,I.E., STR(1:1) MUST BE MATCHED
C BY PAT(1:1)
C
C LOCAL DATA:
      PARAMETER IPATLIM=16
      INTEGER*2 JALT(IPATLIM),LM(IPATLIM),IPAT
C JALT(IPAT) IS A POINTER TO THE ALTERNATIVE OF PATTERN ELEMENT
C PAT(IPAT)
C LM(IPAT) IS THE LENGTH OF THE STRING MATCHED BY PAT(IPAT)
      LOGICAL B,BMATCH2
C
D     TYPE *,'    CMATCH2 ENTERED'
D     TYPE *,'    PATLIM=',PATLIM,' STRLIM=',STRLIM
      LSTRMATCH = 0
      IPAT = 1
  100 CONTINUE
      JALT(IPAT) = 0
  200 CONTINUE
D     TYPE *,'    JUST BEFORE CALL TO BMATCH2,IPAT=',IPAT
      B=BMATCH2(PAT(IPAT:IPAT),STR,LSTRMATCH+1,LM(IPAT)
     +,STRLIM,JALT(IPAT),IRLS)
D     TYPE *,'    JUST AFTER RETURN FROM BMATCH2'
      IF (B) THEN
         LSTRMATCH = LSTRMATCH + LM(IPAT)
```

```
            IF (IPAT .LT. PATLIM) THEN
                 IPAT = IPAT + 1
                 GO TO 100
            ELSE
         CMATCH2 = .TRUE.
         TYPE *,'    LEAVING CMATCH2, TRUE, LSTRMATCH=',LSTRMATCH
         RETURN
            ENDIF
         ELSE
            IF (IPAT .GT. 1) THEN
         IPAT = IPAT - 1
         LSTRMATCH = LSTRMATCH - LM(IPAT)
         GO TO 200
            ELSE
         CMATCH2 = .FALSE.
D        TYPE *,'    LEAVING CMATCH2, FALSE,
        +LSTRMATCH=',LSTRMATCH
         RETURN
            ENDIF
         ENDIF
         END
```

E. FILE CLMATCH2.FOR

```
      LOGICAL FUNCTION CLMATCH2(PAT,PATLIM,STR,STRLIM,
     +LSTRMATCH,IRLS)
      CHARACTER*(*) PAT,STR
      INTEGER*2 (PATLIM,STRLIM,LSTRMATCH,IRLS
C
C CLMATCH2 TRIES TO MATCH THE PATTERN IN PAT TO THE STRING IN
C STR.
C LIMITS ARE PAT(1:PATLIM), STR(1:STRLIM)
C IRLS IS THE RULE SET NUMBER
C THIS ROUTINE IS A VARIANT OF CMATCH, LOOKING FROM RIGHT
C TO LEFT INSTEAD OF FROM LEFT TO RIGHT!!
C IF SUCCESSFUL, CLMATCH2=.TRUE. AND THE STRING WAS MATCHED
C OVER STR(LSTRMATCH:STRLIM).  IF NOT SUCCESSFUL, CLMATCH2=
C .FALSE. OPERATES IN RIGHT ANCHOR MODE, I.E.,
C STR(STRLIM:STRLIM) MUST BE MATCHED BY PAT(PATLIM:PATLIM).
C
C LOCAL DATA:
      PARAMETER IPATLIM=16
      INTEGER*2 JALT(IPATLIM),LM(IPATLIM)
C JALT(IPAT) IS A POINTER TO THE ALTERNATIVE OF PATTERN ELEMENT
C PAT(IPAT)
C LM(IPAT) IS THE LENGTH OF THE STRING MATCHED BY PAT(IPAT)
      LOGICAL B,BLMATCH2
C
D     TYPE *,' ENTERING CLMATCH2, PAT=',PAT(1:PATLIM)
D     TYPE *,'   PATLIM=',PATLIM
D     TYPE *,'   STR=',STR(1:STRLIM)
D     TYPE *,'   STRLIM=',STRLIM,', LSTRMATCH=',LSTRMATCH
      LSTRMATCH = STRLIM+1
      IPAT = PATLIM
  100 CONTINUE
      JALT(IPAT) = 0
  200 CONTINUE
      B=BLMATCH2(PAT(IPAT:IPAT),STR,LSTRMATCH-1,LM(IPAT),
     +JALT(IPAT),IRLS)
         IF (B) THEN
            LSTRMATCH = LSTRMATCH - LM(IPAT)
            IF (IPAT .GT. 1) THEN
               IPAT = IPT - 1
         GO TO 100
         ELSE
```

```
          CLMATCH2 = .TRUE.
          RETURN
       ENDIF
        ELSE
          IF (IPAT .LT. PATLIM) THEN
        IPAT = IPAT + 1
        LSTRMATCH = LSTRMATCH + LM(IPAT)
        GO TO 200
                 ELSE
        CLMATCH2 = .FALSE.
        RETURN
           ENDIF
         ENDIF
         END
```

F. SUBROUTINE RUNPACKA.FOR

```
      SUBROUTINE RUNPACKA(PACKED_RULE,LRP,L,RULE_PART,JPART,
     +I,IERR)
      CHARACTER*(*) PACKED_RULE
      CHARACTER*32 RULE_PART
      INTEGER*2 LRP,L(4),JPRT,I
C
C UNPACKS A RULE FROM A SINGLE CHARACTER STRING INTO
C A GENERAL INTERNAL FORM.
C
C WORKS WITH RULES PACKED INTO INTERNAL FORMAT 'A'.
C
C IF JPART=N, THE NTH PART OF THE RULE IS UNPACKED AND RETURNED
C WHEN JPART=1, THE TOTAL LENGTH OF THE RULE IS ALSO RETURNED.
C I IS A POINTER WHOSE VALUE MUST BE PRESERVED BETWEEN CALLS.
C THE VALUES OF JPART ON SUCCESSIVE CALLS SHOULD BE 1,2,3,4.
C THE PACKED RULE STRING IS FOUND IN PACKED_RULE(1:).
C FOR PROPER RULE PACKING, USE RPACKA.
C IN THIS VERSION, THE RULE IS PACKED AS:
C BYTE 1 : TOTAL LENGTH OF RULE IN BYTES
C NEXT (LS+1) BYTES: 1 BYTE HOLDING LENGTH OF S PART OF RULE,
C FOLLOWED BY THE BYTES COMPRISING THE S PART
C NEXT (LRE+1) BYTES: 1 BYTE HOLDING LENGTH OF RE PART OF RULE,
C FOLLOWED BY THE BYTES COMPRISING THE RE PART
C NEXT (LLE+1) BYTES: 1 BYTE HOLDING LENGTH OF LE PART OF RULE,
C FOLLOWED BY THE BYTES COMPRISING THE LE PART
C NEXT (LT+1) BYTES 1 BYTE HOLDING LENGTH OF T PART OF RULE,
C FOLLOWED BY THE BYTES COMPRISING THE T PART
C TOTAL LENGTH OF PACKED RULE = LS+LRE+LLE+LT+5
C
C
C RETURNS IERR > 0 IFF ERROR
C
C LOCAL DATA
      INTEGER*2 LX,
C CODE
      IERR=0
      IF (JPART .EQ. 1) THEN
        LPR=ICHAR(PACKED_RULE(1:1)
        IF (LPR .LT. 1) GO TO 9999
        I=2
      ENDIF
      LX=ICHAR(PACKED_RULE(I:I))
      L(JPART)=LX
      IF (LX .GT. 0) RULE_PART=PACKED_RULE(I+1:I+LX)
  200 I=I+LX+1
 9999 RETURN
      END
```

G. SUBROUTINE RUNPACKC.FOR

```
      SUBROUTINE RUNPACKC(PACKED_RULE,LPR,L,RULE_PART,JPART,
     +I,IERR)
      CHARACTER*(*) PACKED_RULE
      CHARACTER*32 RULE_PART
      INTEGER*2 LPR,L(4),JPART,I
C
C UNPACKS A RULE FROM A SINGLE CHARACTER STRING INTO
C A GENERAL INTERNAL FORM.
C
C WORKS WITH RULES PACKED INTO INTERNAL FORMAT 'C'.
C
C IF JPART=N, THE NTH PART OF THE RULE IS UNPACKED AND RETURNED
C WHEN JPART=1, THE TOTAL LENGTH OF THE RULE IS ALSO RETURNED.
C I IS A POINTER WHOSE VALUE MUST BE PRESERVED BETWEEN CALLS.
C THE VALUES OF JPART ON SUCCESSIVE CALLS SHOULD BE 1,2,3,4.
C THE PACKED RULE STRING IS FOUND IN PACKED RULE(1:).
C FOR PROPER RULE PACKING, USE SUBROUTINE RPACKC.
C IN THIS VERSION, THE RULE IS PACKED AS:
C BYTE 1 : FIRST 4 BITS: LS
C          NEXT 4 BITS: LRE
C BYTE 2 : FIRST 4 BITS: LLE
C          NEXT 4 BITS: LT
C NEXT (LS-1) BYTES: S(2:LS)
C NEXT (LRE) BYTES: RE(1:LRE)
C NEXT (LLE) BYTES: LE(1:LLE)
C NEXT (LT) BYTES: T(1:LT)
C
C
C RETURNS IERR > 0 IFF ERROR
C
C LOCAL DATA
      INTEGER*2 LX
C CODE
      IERR=0
D     TYPE *,' IN RUNPACKC, JPART=',JPART
      IF (JPART .EQ. 1) THEN
        LX=ICHAR(PACKED_RULE(1:1))
D       TYPE *,' FIRST BYTE=',LX
        L(1)=LX/16
D       TYPE *,' L(1)=',L(1)
        L(2)=LX-(L(1)*16)
D       TYPE *,' L(2)=',L(2)
        LX=ICHAR(PACKED_RULE(2:2))
D       TYPE *,' SECOND BYTE=',LX
        L(3)=LX/16
D       TYPE *,' L(3)=',L(3)
        L(4)=LX-(L(3)*16)
D       TYPE *,' L(4)=',L(4)
        LPR=L(1)+L(2)+L(3)+L(4)+2
D       TYPE *,' LPR=',LPR
        I=2
      ENDIF
      LX=L(JPART)
      IF (LX .GT. 0) RULE_PART=PACKED_RULE(I+1:I+LX)
 200  I=I+LX
 9999 RETURN
      END
```

H. FILE BMATCH2.FOR

```
      LOGICAL FUNCTION BMATCH2(PAT,S,IL,IDEL,ILIM,J,IRLS)
      CHARACTER PAT
```

```
      CHARACTER*(*) S
      INTEGER*2 IL,IDEL,ILIM,J,IRLS
C
C BMATCH2 RETURNS .TRUE. IFF THE PATTERN ELEMENT IN PAT
C MATCHES STRING S BEGINNING AT S(IL:IL), NOT LOOKING
C BEYOND S(ILIM:ILIM).
C IRLS IS THE RULE SET NUMBER
C IF PAT DENOTES A LIST OF ALTERNATIVE PATTERNS,
C BMATCH2 FIRST TRIES THE 'J + 1'TH ALTERNATIVE.
C IF SUCCESSFUL, BMATCH2 RETURNS IDEL=THE NUMBER OF
C CHARACTERS MATCHED IN S
C
      INCLUDE '[FISHER.PROD]COMUDS.FOR'
      INCLUDE '[FISHER.PROD]COMRDS.FOR'
C
C LOCAL DATA:
      INTEGER*2 UDS_BASE,IPAT,IR,IUDS,IALT1,JLIM,J2
D     TYPE *,' BMATCH2 ENTERED'
      IDEL=0
      IPAT=ICHAR(PAT)
      J=J+1
D     TYPE *,' ICHAR(PAT)=IPAT=',IPAT
D     TYPE *,' IL=',IL,', ILIM=',ILIM
D     DO 69 IDB=IL,ILIM
D     TYPE*,'    I=',IDB,',ICHAR(S(I:I))=',ICHAR(S(IDB:IDB))
D  69 CONTINUE
D     TYPE *,' ALTNO=J',J
C HANDLE USER-DEFINED SYMBOLS
      IF (IPAT .LT. MIN_UDS_CODE(IRLS)) GO TO 200
      IF (IPAT .GT. MAX_UDS_CODE(IRLS)) GO TO 200
D     TYPE *,' UDS CHARACTER'
      UDS_BASE=UDS_OFFSET(IRLS)
      IUDS=UDS_BASE + (IPAT - MIN_UDS_CODE(IRLS) + 1)
      IF (UDSTYPE(IUDS) .EQ. 1) GO TO 100
C UDS TYPE 2
D     TYPE *,' TYPE 2'
      IF ((NCHRALT1(IUDS) .EQ. 0) .AND. (J .EQ. 1)) THEN
         IDEL=0
         GO TO 8888
         ENDIF
      IR=IL+NCHRALT1(IUDS)+J-2
      IF (IR .GT. ILIM) GO TO 7777
      IALT1=IUSYM1(UDSNBR(IUDS))
      JLIM=NUSYMALT(UDSNBR(IUDS))
      J2=1
      CALL AMATCH2(S,IR,ILIM,ALT(IALT1),LALT(IALT1),J2,JLIM,
     +IDEL2)
      IF (J2 .GT. JLIM) GO TO 7777
      IDEL=IR-IL+1
      GO TO 8888
  100 CONTINUE
C UDS TYPE 1
D     TYPE *,' TYPE 1'
      IALT1=IUSYM1(IUDS)
      JLIM=NUSYMALT(IUDS)
      CALL AMATCH2(S,IL,ILIM,ALT(IALT1),LALT(IALT1),J,JLIM,
     +IDEL)
      IF (J .GT. JLIM) GO TO 7777
      GO TO 8888
  200 CONTINUE
C HANDLE NON-SPECIAL CHARACTERS
      IF (IL .GT. ILIM) GO TO 7777
D     TYPE *,' NON-SPECIAL CHARACTER'
      IF (J .GT. 1) GO TO 7777
```

```
          IF (PAT .NE. S(IL:IL)) GO TO 7777
          IDEL=1
          GO TO 8888
C FAILURE
 7777 CONTINUE
          BMATCH2=.FALSE.
D         TYPE *,' BMATCH2 FAILED'
          GO TO 9999
C SUCCESS
 8888 CONTINUE
          BMATCH2 = .TRUE.
D         TYPE *,' BMATCH2 SUCCEEDED'
C EXIT
 9999     CONTINUE
          RETURN
          END

I. FILE BLMATCH2.FOR

LOGICAL FUNCTION BLMATCH2(PAT,S,IR,IDEL,J,IRLS)
          CHARACTER PAT
          CHARACTER*(*) S
          INTEGER*2 IR,IDEL,J,IRLS
C
C BLMATCH2 RETURNS .TRUE. IFF THE PATTERN ELEMENT IN PAT
C MATCHES STRING S ENDING AT S(IR:IR).
C IRLS IS THE RULE SET NUMBER
C IF PAT DENOTES A LIST OF ALTERNATIVE PATTERNS,
C BLMATCH2 FIRST TRIES THE 'J + 1'TH ALTERNATIVE.
C IF SUCCESSFUL, BLMATCH2 RETURNS IDEL=THE NUMBER OF
C CHARACTERS MATCHED IN S
C
          INCLUDE '[FISHER.PROD]COMUDS.FOR'
          INCLUDE '[FISHER.PROD]COMRDS.FOR'
C
C LOCAL DATA:
          INTEGER*2 UDS_BASE,IPAT,IUDS,IL,IALT1,JLIM,J2
D         TYPE *,' BLMATCH2 ENTERED'
          IDEL=0
          IPAT=ICHAR(PAT)
          J=J+1
D         TYPE *,'    ICHAR(PAT)=IPAT=i,IPAT
D         TYPE *,'    IR=',IR
D         IDB1=IR-5
D         IF (IDB1 .LT. 1) IDB1=1
D         DO 69 IDB=IDB1,IR
D         TYPE *,'    I=',IDB,',ICHAR(S(I:I))=',ICHAR(S(IDB:IDB))
D  69     CONTINUE
D         TYPE *,'    ALTNBR=J=',J
C HANDLE USER-DEFINED SYMBOLS
          IF (IPAT .LT. MIN_UDS_CODE(IRLS)) GO TO 200
          IF (IPAT .GT. MAX_UDS_CODE(IRLS)) GO TO 200
D         TYPE *,' UDS CHARACTER'
          UDS_BASE=UDS_OFFSET(IRLS)
          IUDS=UDS_BASE+(IPAT-MIN_UDS_CODE(IRLS)+1
          IF (UDSTYPE(IUDS) .EQ. 1) GO TO 100
C UDS TYPE 2
D         TYPE *,'   TYPE 2'
          IF ((NCHRALT1(IUDS) .EQ. 0) .AND. (J .EQ. 1)) THEN
             IDEL=0
             GO TO 8888
             ENDIF
          IL=IR-NCHRALT1(IUDS)-J+2
          IF (IL .LT. 1) GO TO 7777
```

```
        IALT1=IUSYM1(UDSNBR(IUDS))
        JLIM=NUSYMALT(UDSNBR(IUDS))
        J2=1
        CALL ALMATCH2(S,IL,ALT(IALT1),LALT(IALT1),J2,JLIM,IDEL)
        IF (J2 .GT. JLIM) GO TO 7777
        IDEL=IR-IL+1
        GO TO 8888
 100    CONTINUE
C UDS TYPE 1
D       TYPE *,' TYPE 1'
        IALT1=IUSYM1(IUDS)
        JLIM=NUSYMALT(IUDS)
        CALL ALMATCH2(S,IR,ALT(IALT1),LALT(IALT1),J,JLIM,IDEL)
        IF (J .GT. JLIM) GO TO 7777
        GO TO 8888
 200    CONTINUE
C HANDLE NON-SPECIAL CHARACTERS
        IF (IR .LT. 1) GO TO 7777
D       TYPE *,' NON-SPECIAL CHARACTER'
        IF (J .GT. 1) GO TO 7777
        IF (PAT .NE. S(IR:IR)) GO TO 7777
        IDEL=1
        GO TO 8888
C FAILURE
 7777   CONTINUE
        BLMATCH2=.FALSE.
D       TYPE *,' BLMATCH2 FAILED'
        GO TO 9999
C SUCCESS
 8888   CONTINUE
        BLMATCH2 = .TRUE.
D       TYPE *,' BLMATCH2 SUCCEEDED'
C EXIT
 9999   CONTINUE
        RETURN
        END
```

J. SUBROUTINE AMATCH2.FOR

```
        SUBROUTINE AMATCH2(S,IL,ILIM,C,L.J,JLIM,IDEL)
        CHARACTER*(*) S
        CHARACTER*(*) C(128)
        INTEGER*2 IL,ILIM,J,JLIM,IDEL
        INTEGER*2 L(128)
C
C C(I) IS A TABLE OF ARBITRARY STRINGS
C AMATCH2 SEARCHES THIS TABLE, TRYING TO FIND A STRING IN C
C THAT MATCHES THE CHARACTERS IN STRING S BEGINNING WITH
C S(IL:IL). THE SEARCH IS LINEAR, STARTING WITH C(J)
C AND ENDING WHEN J > JLIM OR A MATCH OCCURS.
C ON SUCCESS, J POINTS TO THE MATCHED ENTRY AND IDEL
C CONTAINS L(J), THE LENGTH OF C(J) IN NUMBER OF
C CHARACTERS.  ON FAILURE, J > JLIM.
C
        GO TO 200
 100    CONTINUE
        J=J+1
 200    CONTINUE
        IF (J .GT. JLIM) GO TO 999
        IR=IL+L(J)-1
        IF (IR .GT. ILIM) GO TO 100
        IF (S(IL:IR) .NE. C(J)(1:L(J))) GO TO 100
        IDEL=L(J)
```

```
999 CONTINUE
      RETURN
      END
```

K. SUBROUTINE ALMATCH1.FOR

```
      SUBROUTINE ALMATCH2(S,IR,C,L,J,JLIM,IDEL)
      CHARACTER*(*) S
      CHARACTER*(*) C(128)
      INTEGER*2 IR,J,JLIM,IDEL
      INTEGER*2 L(128)
C
C C(I) IS A TABLE OF ARBITRARY STRINGS
C ALMATCH2 SEARCHES THIS TABLE, TRYING TO FIND A STRING IN C
C THAT MATCHES THE CHARACTERS IN STRING S ENDING WITH
C S(IR:IR). THE SEARCH IS LINEAR, STARTING WITH C(J)
C AND ENDING WHEN J > JLIM OR A MATCH OCCURS.
C ON SUCCESS, J POINTS TO THE MATCHED ENTRY AND IDEL
C CONTAINS L(J), THE LENGTH OF C(J) IN NUMBER OF
C CHARACTERS.  ON FAILURE, J > JLIM.
C THIS IS A VARIANT OF AMATCH2 FOR LEFT-LOOKING SEARCHES.
C
      GO TO 200
  100 CONTINUE
      J=J+1
  200 CONTINUE
      IF (J .GT. JLIM) GO TO 999
      IL = IR - L(J) + 1
      IF (IL .LT. 1) GO TO 100
      IF (S(IL:IR) .NE. C(J)(1:L(J))) GO TO 100
      IDEL=L(J)
  999 CONTINUE
      RETURN
      END
```

SYLLABIFICATION RULES

```
C FILE UD:[FISHER]PPSYLB51.RLS

C
C SET OF PHONEME-TO-PHONEME RULES
C INPUT IS  PHONEMES FROM PCODEFILE=UD:[FISHER]PCODE5.DAT
C OUTPUT IS PHONEMES FROM PCODEFILE=UD:[FISHER]PCODE5.DAT
C RULE FAILURE ACTION = 'PASS'
C
C THIS IS A SET OF RULES TO INSERT SYLLABLE BOUNDARIES.
C THIS VERSION INSERTS THEM BEFORE SINGLE INTER-VOCALIC
C CONSONANTS, BUT NOT WORD-INITIALLY.
C IN THIS VERSION, I HAVE TRIED TO MAKE THE GENERALIZATION
C THAT WITH AN INTER-VOCALIC CONSONANT CLUSTER BETWEEN A
C STRESSED VOWEL AND AN UNSTRESSED ONE, THE SYLLABLE
C BOUNDARY IS PUT AS FAR TO THE RIGHT AS POSSIBLE, BUT
C OTHERWISE, THE SYLLABLE BOUNDARY IS PUT AS FAR TO THE
C LEFT AS POSSIBLE.
C NOTE: SOME INTERVOCALIC CONSONANT CLUSTERS WILL BE DIVIDED
C BY THE INSERTION OF TWO SYLLABLE BOUNDARIES, E.G.:
C       AX S T . . L AX
C RULES APPLYING TO THE OUTPUT OF THIS RULE SET MUST TREAT
C A SERIES OF TWO SYLLABLE BOUNDARIES THE SAME AS ONE.
C FOLLOW THIS WITH RULE SET PPSYLB52 TO REMOVE EXTRA
C BOUNDARIES.
C*************************************************************
C
C
*         ***** SYMBOL SECTION BEGINS HERE *****
C
```

```
      {MB} = '-'/'--'/'<,>'/'<;>'/'<:>'/'<.>'/'<?>'/'='/'+'
      {MSTR} = "'0"/"'1"/"'2"/"'3"
      $'0 = "'0"
      {+STR} = "'1"/"'2"/"'3"
      {-STR} = 0-OR-MORE($'0)
      {'} = 0-OR-MORE({MSTR})
      {C} = 'P'/'B'/'T'/'D'/'K'/'G'/'F'/'V'/'TH'/'DH'/'S'/'Z'/
     +     'SH'/'ZH'/'HH'/'M'/'N'/'NX'/'L'/'W'/'Y'/'R'/'CH'/
     +     'JH'/'WH'
      {V} = 'IY'/'IH'/'EY'/'EH'/'AE'/'AA'/'AO'/'OW'/'UH'/'UW'/
            'ER'/'AX'/'AY'/'AW'/'OY'
      {SEG} = 'P'/'B'/'T'/'D'/'K'/'G'/'F'/'V'/'TH'/'DH'/'S'/
     +        'Z'/
     +        'SH'/'ZH'/'HH'/'M'/'N'/'NX'/'L'/'W'/'Y'/'R'/
     +        'CH'/'JH'/'WH'/
     +        'IY'/'IH'/'EY'/'EH'/'AE'/'AA'/'AO'/'OW'/'UH'/
     +        'UW'/'ER'/'AX'/'AY'/'AW'/'OY'
      {C0-N} = 0-OR-MORE({C})
      {C1-N} = 1-OR-MORE({C})
      {V1-N} = 1-OR-MORE({V})
C           ***** RULE SECTION BEGINS HERE *****
C RULE FORMAT B
C
C
C SEGMENTAL RULES
C
      [+] => [.]
C
      [=] => [.]
C
C VOWEL CLUSTER RULES
      [IY] => [IY .] / ___ [(') {V}]
      [IH] => [IH .] / ___ [(') {V}]
      [EY] => [EY .] / ___ [(') {V}]
      [EH] => [EH .] / ___ [(') {V}]
      [AE] => [AE .] / ___ [(') {V}]
      [AA] => [AA .] / ___ [(') {V}]
      [AO] => [AO .] / ___ [(') {V}]
      [OW] => [OW .] / ___ [(') {V}]
      [UH] => [UH .] / ___ [(') {V}]
      [UW] => [UW .] / ___ [(') {V}]
      [ER] => [ER .] / ___ [(') {V}]
      [AX] => [AX .] / ___ [(') {V}]
      [AY] => [AY .] / ___ [(') {V}]
      [AW] => [AW .] / ___ [(') {V}]
      [OY] => [OY .] / ___ [(') {V}]
C
C CONSONANT CLUSTER RULES
C
C
C MAXIMAL FINAL CLUSTERS WITH NEGATIVE STRESS GRADIENT
      [P S] => [P S .] / [{+STR} {V1-N}] ___
     +[{C0-N} {-STR}{V}]
      [P] => [P .] / [{+STR} {V1-N}] ___ [{C0-N} {-STR} {V}]
C MAXIMAL INITIAL CLUSTERS OTHERWISE
      [P L] => [. P L] / [{V} {C0-N}] ___ [(') {V}]
      [P R] => [. P R] / [{V} {C0-N}] ___ [(') {V}]
      [P W] => [. W L] / [{V} {C0-N}] ___ [(') {V}]
      [P Y] => [. Y L] / [{V} {C0-N}] ___ [(') {V}]
      [P] => [. P] / [{V} {C0-N}] ___ [(') {V}]
C
      [T S] => [T S .] / [{+STR} {V1-N}] ___
     +[{C0-N} {-STR} {V}]
      [T] => [T .] / [{+STR} {V1-N}] ___
```

```
                        +[{CO-N} {-STR} {V}]
C
    [T R] => [. T R] / [{V} {CO-N}] ___    [(') {V}]
    [T W] => [. T W] / [{V} {CO-N}] ___    [(') {V}]
    [T]   => [. T]   / [{V} {CO-N}] ___    [(') {V}]
C
    [K S] => [K S .] / [{+STR} {V1-N}] ___
    +[{CO-N} {-STR} {V}]
    [K]   => [K .]   / [{+STR} {V1-N}] ___
    +[{CO-N} {-STR} {V}]
C
    [K L] => [. K L] / [{V} {CO-N}] ___    [(') {V}]
    [K R] => [. K R] / [{V} {CO-N}] ___    [(') {V}]
    [K W] => [. K W] / [{V} {CO-N}] ___    [(') {V}]
    [K Y] => [. K Y] / [{V} {CO-N}] ___    [(') {V}]
    [K]   => [. K]   / [{V} {CO-N}] ___    [(') {V}]
C
    [B Z] => [B Z .] / [{+STR} {V1-N}] ___ /
    +[{CO-N} {-STR} {V}]
C
    [B L] => [. B L] / [{V} {CO-N}] ___    [(') {V}]
    [B R] => [. B R] / [{V} {CO-N}] ___    [(') {V}]
    [B Y] => [. B Y] / [{V} {CO-N}] ___    [(') {V}]
    [B]   => [. B]   / [{V} {CO-N}] ___    [(') {V}]
C
    [D Z] => [D Z .] / [{+STR} {V1-N}] ___
    +[{CO-N} {-STR} {V}]
    [D]   => [D .]   / [{+STR} {V1-N}] ___
    +[{CO-N} {-STR} {V}]
C
    [D R] => [. D R] / [{V} {CO-N}] ___    [(') {V}]
    [D W] => [. D W] / [{V} {CO-N}] ___    [(') {V}]
    [D]   => [. D]   / [{V} {CO-N}] ___    [(') {V}]
C
    [G Z] => [G Z .] / [{+STR} {V1-N}] ___
    +[{CO-N} {-STR} {V}]
    [G]   => [G .]   / [{+STR} {V1-N}] ___
    +[{CO-N} {-STR} {V}]
C
    [G L] => [. G L] / [{V} {CO-N}] ___    [(') {V}]
    [G R] => [. G R] / [{V} {CO-N}] ___    [(') {V}]
    [G Y] => [. G W] / [{V} {CO-N}] ___    [(') {V}]
    [G]   => [. G]   / [{V} {CO-N}] ___    [(') {V}]
C
    [S P] => [S P .] / [{+STR} {V1-N}] ___
    +[{CO-N} {-STR} {V}]
    [S T] => [S T .] / [{+STR} {V1-N}] ___
    +[{CO-N} {-STR} {V}]
    [S K] => [S K .] / [{+STR} {V1-N}] ___
    +[{CO-N} {-STR} {V}]
    [S]   => [S .]   / [{+STR} {V1-N}] ___
    +[{CO-N} {-STR} {V}]
C
    [S P]  => [. S P]  / [{V} {CO-N}] ___   [(') {V}]
    [S P L]=> [. S P L]/ [{V} {CO-N}] ___   [(') {V}]
    [S P R]=> [. S P R]/ [{V} {CO-N}] ___   [(') {V}]
    [S L]  => [. S L]  / [{V} {CO-N}] ___   [(') {V}]
    [S M]  => [. S M]  / [{V} {CO-N}] ___   [(') {V}]
    [S T]  => [. S T]  / [{V} {CO-N}] ___   [(') {V}]
    [S T R]=> [. S T R]/ [{V} {CO-N}] ___   [(') {V}]
    [S N]  => [. S N]  / [{V} {CO-N}] ___   [(') {V}]
    [S K]  => [. S K]  / [{V} {CO-N}] ___   [(') {V}]
    [S K R]=> [. S K R]/ [{V} {CO-N}] ___   [(') {V}]
    [S W]  => [. S W]  / [{V} {CO-N}] ___   [(') {V}]
    [S]    => [. S]    / [{V} {CO-N}] ___   [(') {V}]
``` c
```
    [F S] => [F S .] / [{+STR} {V1-N}] ___
+[{CO-N} {-STR} {V}]
    [F T] => [F T .] / [{+STR} {V1-N}] ___
+[{CO-N} {-STR} {V}]
    [F] => [F .] / [{+STR} {V1-N}] ___
+[{CO-N} {-STR} {V}]
```
c
```
    [F L] => [. F L] / [{V} {CO-N}] ___   [(') {V}]
    [R R] => [. F R] / [{V} {CO-N}] ___   [(') {V}]
    [F Y] => [. F Y] / [{V} {CO-N}] ___   [(') {V}]
    [F] => [. F] / [{V} {CO-N}] ___   [(') {V}]
```
c
```
    [V] => [V .] / [{+STR} {V1-N}] ___
+[{CO-N} {-STR} {V}]
```
c
```
    [V] => [. V] / [{V} {CO-N}] ___   [(') {V}]
```
c
```
    [TH] => [TH .] / [{+STR} {V1-N}] ___
+[{CO-N} {-STR} {V}]
```
c
```
    [TH R] => [. TH R] / [{V} {CO-N}] ___   [(') {V}]
    [TH] => [. TH] / [{V} {CO-N}] ___   [(') {V}]
```
c
```
    [DH] => [DH .] / [{+STR} {V1-N}] ___
+[{CO-N} {-STR} {V}]
```
c
```
    [DH] => [. DH] / [{V} {CO-N}] ___   [(') {V}]
```
c
```
    [Z] => [Z .] / [{+STR} {V1-N}] ___
+[{CO-N} {-STR} {V}]
```
c
```
    [Z] => [. Z] / [{V} {CO-N}] ___   [(') {V}]
```
c
```
    [SH] => [SH .] / [{+STR} {V1-N}] ___
+[{CO-N} {-STR} {V}]
```
c
```
    [SH R] => [. SH R] / [{V} {CO-N}] ___   [(') {V}]
    [SH] => [. SH] / [{V} {CO-N}] ___   [(') {V}]
```
c
```
    [ZH] => [ZH .] / [{+STR} {V1-N}] ___
+[{CO-N} {-STR} {V}]
```
c
```
    [ZH] => [. ZH] / [{V} {CO-N}] ___   [(') {V}]
```
c
```
    [HH] => [. HH] / [{V} {CO-N}] ___   [(') {V}]
```
c
```
    [M Z] => [M Z .] / [{+STR} {V1-N}] ___
+[{CO-N} {-STR} {V}]
    [M P] => [M P .] / [{V} {CO-N}] ___
+[(') {V}] [{CO-N} {-STR} {V}]
    [M] => [M .] / [{V} {CO-N}] ___
+[(') {V}] [{CO-N} {-STR} {V}]
```
c
```
    [M] => [. M] / [{V} {CO-N}] ___   [(') {V}]
    [M Y] => [. M Y] / [{V} {CO-N}] ___   [(') {V}]
```
c
```
    [N Z] => [N Z .] / [{+STR} {V1-N}] ___
+[{CO-N} {-STR} {V}]
    [N T] => [N T .] / [{+STR} {V1-N}] ___
+[{CO-N} {-STR} {V}]
    [N D] => [N D .] / [{+STR} {V1-N}] ___
+[{CO-N} {-STR} {V}]
    [N S] => [N S .] / [{+STR} {V1-N}]
```

```
           +[{CO-N} {-STR} {V}]
           [N JH] => [N JH .] / [{+STR} {V1-N}] ___
           +[{CO-N} {-STR} {V}]
           [N CH] => [N CH .] / [{+STR} {V1-N}] ___
           +[{CO-N} {-STR} {V}]
           [N TH] => [N TH .] / [{+STR} {V1-N}] ___
           +[{CO-N} {-STR} {V}]
C
C THE FOLLOWING TWO RULES COUNT ON NASAL ASSIMILATION
C OCCURRING AFTER THIS SET OF RULES
C
           [N G] => [N G .] / [{+STR} {V1-N}] ___
           +[{CO-N} {-STR} {V}]
           [N K] => [N K .] / [{+STR} {V1-N}] ___
           +[{CO-N} {-STR} {V}]
           [N] => [N .] / [{+STR} {V1-N}] ___
           +[{CO-N} {-STR} {V}]
C
           [N] => [. N] / [{V} {CO-N}] ___ [(') {V}]
C
           [NX Z] => [NX Z .] / [{+STR} {V1-N}] ___
           +[{CO-N} {-STR} {V}]
           [NX K] => [NX K .] / [{+STR} {V1-N}] ___
           +[{CO-N} {-STR} {V}]
C
C N.B. - WITH RESPECT TO THE FOLLOWING RULE, /NX G/ IS A
C VALID FINAL ONLY BEFORE WORD-FINAL /G/ DELETION.
C ALSO, IF NASAL PLACE-OF-ARTICULATION ASSIMILATION IS PUT
C IN AFTER THESE SYLLABIFICATION RULES, THEN THE RULES FOR
C /NX {C}/ FINALS SHOULD BE CHANGED TO /N {C}/ RULES.
C
           [NX G] =< [NX G .] / [{+STR} {V1-N}] ___
           +[{CO-N} {-STR} {V}]
           [NX] => [NX .] / [{+STR} {V1-N}] ___
           +[{CO-N} {-STR} {V}]
C
C N.B. - NO SYLLABLE-INITIAL /NX/ ?
*
           [L P S]=> [L P S .] / [{+STR} {V1-N}] ___
           +[{CO-N} {-STR} {V}]
           [L T S]=> [L T S .] / [{+STR} {V1-N}] ___
           +[{CO-N} {-STR} {V}]
           [L K S]=> [L K S .] / [{+STR} {V1-N}] ___
           +[{CO-N} {-STR} {V}]
           [L B Z]=> [L B Z .] / [{+STR} {V1-N}] ___
           +[{CO-N} {-STR} {V}]
           [L D Z]=> [L D Z .] / [{+STR} {V1-N}] ___
           +[{CO-N} {-STR} {V}]
           [L G Z]=> [L G Z .] / [{+STR} {V1-N}] ___
           +[{CO-N} {-STR} {V}]
           [L M Z]=> [L M Z .] / [{+STR} {V1-N}] ___
           +[{CO-N} {-STR} {V}]
           [L N Z]=> [L N Z .] / [{+STR} {V1-N}] ___
           +[{CO-N} {-STR} {V}]
           [L F S]=> [L F S .] / [{+STR} {V1-N}] ___
           +[{CO-N} {-STR} {V}]
           [L TH S]=>[L TH S .] / [{+STR} {V1-N}] ___
           +[{CO-N} {-STR} {V}]
           [L V Z]=> [L V Z .] / [{+STR} {V1-N}] ___
           +[{CO-N} {-STR} {V}]
           [L P]=> [L P .] / [{+STR} {V1-N}] ___
           +[{CO-N} {-STR} {V}]
           [L T]=> [L T .] / [{+STR} {V1-N}] ___
           +[{CO-N} {-STR} {V}]
```

```
     [L K]=> [L K .] / [{+STR} {V1-N}] ___
  +[{CO-N} {-STR} {V}]
     [L B]=> [L B .] / [{+STR} {V1-N}] ___
  +[{CO-N} {-STR} {V}]
     [L D]=> [L D .] / [{+STR} {V1-N}] ___
  +[{CO-N} {-STR} {V}]
     [L G]=> [L G .] / [{+STR} {V1-N}] ___
  +[{CO-N} {-STR} {V}]
     [L Z]=> [L Z .] / [{+STR} {V1-N}] ___
  +[{CO-N} {-STR} {V}]
     [L M]=> [L M .] / [{+STR} {V1-N}] ___
  +[{CO-N} {-STR} {V}]
     [L N]=> [L N .] / [{+STR} {V1-N}] ___
  +[{CO-N} {-STR} {V}]
     [L F]=> [L F .] / [{+STR} {V1-N}] ___
  +[{CO-N} {-STR} {V}]
     [L SH]=> [L SH .] / [{+STR} {V1-N}] ___
  +[{CO-N} {-STR} {V}]
     [L TH]=> [L TH .] / [{+STR} {V1-N}] ___
  +[{CO-N} {-STR} {V}]
     [L V]=> [L V .] / [{+STR} {V1-N}] ___
  +[{CO-N} {-STR} {V}]
     [L]=> [L .] / [{+STR} {V1-N}] ___
  +[{CO-N} {-STR} {V}]
c
     [L] => [. L] / [{V} {CO-N}] ___ [(') {V}]
c
     [W]=> [W .] / [{+STR} {V1-N}] ___
  +[{CO-N} {-STR} {V}]
c
     [W] => [. W] / [{V} {CO-N}] ___ [(') {V}]
c
     [Y] => [. Y] / [{V} {CO-N}] ___ [(') {V}]
c
     [R P S]=> [R P S .] / [{+STR} {V1-N}] ___
  +[{CO-N} {-STR} {V}]
     [R T S]=> [R T S .] / [{+STR} {V1-N}] ___
  +[{CO-N} {-STR} {V}]
     [R K S]=> [R K S .] / [{+STR} {V1-N}] ___
  +[{CO-N} {-STR} {V}]
     [R B Z]=> [R B Z .] / [{+STR} {V1-N}] ___
  +[{CO-N} {-STR} {V}]
     [R D Z]=> [R D Z .] / [{+STR} {V1-N}] ___
  +[{CO-N} {-STR} {V}]
     [R G Z]=> [R G Z .] / [{+STR} {V1-N}] ___
  +[{CO-N} {-STR} {V}]
     [R M Z]=> [R M Z .] / [{+STR} {V1-N}] ___
  +[{CO-N} {-STR} {V}]
     [R N Z]=> [R N Z .] / [{+STR} {V1-N}] ___
  +[{CO-N} {-STR} {V}]
     [R F S]=> [R F S .] / [{+STR} {V1-N}] ___
  +[{CO-N} {-STR} {V}]
     [R DH Z]=> [R DH Z .] / [{+STR} {V1-N}] ___
  +[{CO-N} {-STR} {V}]
     [R V Z]=> [R V Z .] / [{+STR} {V1-N}] ___
  +[{CO-N} {-STR} {V}]
     [R P]=> [R P .] / [{+STR} {V1-N}] ___
  +[{CO-N} {-STR} {V}]
     [R T]=> [R T .] / [{+STR} {V1-N}] ___
  +[{CO-N} {-STR} {V}]
     [R K]=> [R K .] / [{+STR} {V1-N}] ___
  +[{CO-N} {-STR} {V}]
     [R L]=> [R L .] / [{+STR} {V1-N}] ___
  +[{CO-N} {-STR} {V}]
```

```
    [R B]=> [R B .] / [{+STR} {V1-N}] ___
   +[{CO-N} {-STR} {V}]
    [R D]=> [R D. ] / [{+STR} {V1-N}] ___
   +[{CO-N} {-STR} {V}]
    [R G]=> [R G .] / [{+STR} {V1-N}] ___
   +[{CO-N} {-STR} {V}]
    [R Z]=> [R Z .] / [{+STR} {V1-N}] ___
   +[{CO-N} {-STR} {V}]
    [R M]=> [R M .] / [{+STR} {V1-N}] ___
   +[{CO-N} {-STR} {V}]
    [R N]=> [R N .] / [{+STR} {V1-N}] ___
   +[{CO-N} {-STR} {V}]
    [R F]=> [R F .] / [{+STR} {V1-N}] ___
   +[{CO-N} {-STR} {V}]
    [R SH]=> [R SH .] / [{+STR} {V1-N}] ___
   +[{CO-N} {-STR} {V}]
    [R TH]=> [R TH .] / [{+STR} {V1-N}] ___
   +[{CO-N} {-STR} {V}]
    [R DH]=> [R DH .] / [{+STR} {V1-N}] ___
   +[{CO-N} {-STR} {V}]
    [R V]=> [R V .] / [{+STR} {V1-N}] ___
   +[{CO-N} {-STR} {V}]
    [R]=> [R .] / [{+STR} {V1-N}] ___
   +[{CO-N} {-STR} {V}]
C
    [R]  => [. R] / [{V} {CO-N}] ___ [(') {V}]
C
    [CH]=> [CH .] / [{+STR} {V1-N}] ___
   +[{CO-N} {-STR} {V}]
C
    [CH] => [. CH] / [{V} {CO-N}] ___ [(') {V}]
C
    [JH]=> [JH .] / [{+STR} {V1-N}] ___
   +[{CO-N} {-STR} {V}]
    [JH] => [. JH] / [{V} {CO-N}] ___ [(') {V}]
C.
    [WH] => [. WH] / [{V} {CO-N}] ___ [(') {V}]
C
```

What is claimed is:

1. Apparatus for transforming a plurality of input segments to produce a plurality of syllabified output segments comprising:
an input buffer for receiving said input segments;
a memory for storing a set of transforming rules for selectively transforming an input segment an output segment;
a memory for storing a plurality of special symbols that each match a plurality of symbols used to represent said input segments, said special symbols used in formulating selected ones of said rules and each defined as a function of said symbols by the user;
a processor for applying said rule set to each input segment to produce an output segment; and
an outer buffer for storing said syllabified output segments.

2. Apparatus for transforming a plurality of input segments to produce a plurality of syllabified output segments, comprising:
an input buffer for receiving input segments and left and right environments thereof;
a memory for storing a set of transforming rules for selectively transforming said input segments to said output segments, said rules arranged in rule sections each indexed by a preselected input byte value, each rule having a left environment for comparison to a left environment of an input segment, a right environment for comparison to a right environment of said input segment, a source for comparison to said input segment, and an output part;

a processor for sequentially applying to an input segment a number of rules of those sections having an index matching a preselected input byte of said input segment; and an output buffer for receiving output parts of rules that match respective input segments and left and right environments thereof.

3. A method using automated apparatus for adding syllable boundaries to a series of input bytes to produce a series of output bytes, comprising the steps of:

storing a plurality of rule sections each comprising a number of syllable-marking rules in a rule set;

applying a first rule section of the rule set to the input bytes, including the substeps of:

comparing a source part of a first rule of the first rule section with an input segment having a number of input bytes to determine if a sufficient match exists;

if a sufficient match exits, transforming the input segment with an output part of the first rule to obtain syllabified output data;

if a sufficient match does not exist, repeating the above substeps for succeeding rules of the first rule section until a sufficient match is obtained or until all rules of the first rule section have been compared; and if a sufficient match does not exist, sequentially applying a number of next rule sections in the rule set according to the substeps of applying the first rule section, until all of the next rule sections have been applied or until a sufficient match has been obtained.

4. The method of claim 3, wherein said substep of applying the first rule comprises the further substeps of:

comparing a left environment of the input segment to a left environment of the first rule;

comparing a right environment of the input segment to a right environment of the first rule; and transforming the input segment with the output part of the first rule only if respective sufficient matches are obtained between the left environment of the first rule and the left environment of the input segment, between the right environment of the first rule and the right environment of the input segment, and between the source part of the rule and the input segment.

5. The method of claim 3, and further including the steps of:

providing a drop/pass indicator for the rule set;

passing the input segment to the output data in response to no match being obtained to any rule in the rule set if the drop/pass indicator of the rule set indicates that unmatched data is to be passed; and not passing the input segment in response to no match being obtained to any rule in the rule set if the drop/pass indicator of the rule set indicates that the unmatched segment is to be dropped.

6. The method of claim 3 and further comprising:

storing a plurality of sets of rules; and sequentially applying each set of rules.

7. A method for determining syllable boundaries in a series of segments without marked syllable boundaries by automated apparatus, comprising:

storing a set of transforming rules defining syllable boundaries, said rules each including a source part for comparing with an input segment having a number of input bytes, a left environment for comparing with a number of left environment bytes to the left of said input segment, a right environment for comparing with a number of right, environment bytes to the right of said input segment and an output part having syllabifying indicia;

sequentially comparing said rules with ones of said input segments; and transforming said ones of said input segments with said output parts of matching rules to obtain output data when said input segments and the associated left and right environment bytes match said rules.

8. The method of claim 7 wherein said set of rules defines a syllable boundary immediately preceding a stressed vowel as far left as possible without violation of the structure of a predetermined word-initial consonant cluster.

9. The method of claim 7 wherein said set of rules defines a syllable boundary following a stressed vowel as far to the right as possible without violation of the structure of a predetermined syllable-final consonant cluster.

10. The method of claim 7 wherein said set of rules stresses allophone varieties to the right of a syllable boundary preceding a stressed vowel.

11. The method of claim 7 wherein said set of rules does not stress allophone varieties following a stressed vowel and preceding a syllable boundary.

12. The method of claim 7 and further comprising:

representing said bytes using predetermined symbols;

storing a set of special symbols each representing more than one of the symbols used in representing said bytes; and transforming said ones of said segments in accordance with said stored set of rules and said set of special symbols.

13. The method of claim 12 wherein at least one of said special symbols points to a list of selected ones of said predetermined symbols, such that a byte matching any of the selected ones of said predetermined symbols will match said at least one special symbol.

14. The method of claim 12 wherein at least one of said special symbols represents N-or-more concatenate symbol paterns for comparison with a plurality of adjacent bytes, N being preselected as any integer.

15. The method of claim 7 and further comprising:

dropping ones of said input segments if no rule matches.

16. The method of claim 7 and further comprising:

transforming ones of said input segments unchanged to said output data if no rule matches.

17. Tbe method of claim 7 and further comprising:

storing plural sets of rules; and applying subsequent ones of said sets of rules in sequence to output data from a previous set of rules.

18. The method of claim 12, wherein at least one of said special symbols represents a function of other special symbols.

19. The method of claim 14, wherein each said concatenate symbol pattern comprises at least one further special symbol.

20. A method for determining syllable boundaries in a series of input segments without marked syllable boundaries by automated apparatus, comprising the steps of:

storing a plurality of rule sections in a rule set, each rule section having a number of rules, each rule defining a syllable boundaries, said rules each including, an input part for comparing with an input segment having a number of input bytes, a left environment for comparing with a number of left environment bytes to the left of said input segment, a right environment for compuring with a number of right environment bytes to the right of said input segment, and an output part having syllabifying indicia, the input part of each rule in any rule section being equal to the input part of any other rule in said rule section;

initializing a pointer to be equal to a selected input byte of said segment;

comparing said pointer to each rule section until a match between a rule section and said pointer is made;

comparing said rules of said matched rule section individually with said left environment bytes, said input segment and said right environment bytes until match is found between the left environment, input part and right environment of a rule with said bytes; and transforming said matched input segment by substituting said output part of said matched rule therefor.

21. The method of claim 20 wherein said set of rules defines a syllable boundary immediately preceding a stressed vowel as far left as possible without violation of the structure of a predetermined word-initial consonant cluster.

22. The method of claim 20 wherein said set of rules defines a syllable boundary following a stress vowel as far to the right as possible without violation of the structure of a predetermined syllable-final consonant cluster.

23. The method of claim 20 wherein said set of rules stresses allophone varieties to the right of a syllable boundary preceding a stressed vowel.

24. The method of claim 20 wherein said set of rules does not stress allophone varieties following a stressed vowel and preceding a syllable boundary.

25. The method of claim 20 and further comprising: converting said transformed bytes into speech.

26. The method of claim 20 and further comprising: converting said transformed bytes into properly hyphenated words.

* * * * *